US008817768B2

(12) United States Patent
Ishii et al.

(10) Patent No.: US 8,817,768 B2
(45) Date of Patent: Aug. 26, 2014

(54) MOBILE STATION, BASE STATION, RADIO COMMUNICATION SYSTEM, AND COMMUNICATION CONTROL METHOD

(75) Inventors: Hiroyuki Ishii, Yokosuka (JP); Atsushi Harada, Kawasaki (JP); Anil Umesh, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 652 days.

(21) Appl. No.: 12/529,731

(22) PCT Filed: Feb. 13, 2008

(86) PCT No.: PCT/JP2008/052317
§ 371 (c)(1),
(2), (4) Date: Nov. 6, 2009

(87) PCT Pub. No.: WO2008/108143
PCT Pub. Date: Sep. 12, 2008

(65) Prior Publication Data
US 2010/0074230 A1 Mar. 25, 2010

(30) Foreign Application Priority Data

Mar. 6, 2007 (JP) ................... 2007-056441
Aug. 14, 2007 (JP) ................... 2007-211591
Aug. 15, 2007 (JP) ................... 2007-211982
Dec. 20, 2007 (JP) ................... 2007-329025

(51) Int. Cl.
*H04B 7/208* (2006.01)
*H04W 72/12* (2009.01)
*H04W 72/04* (2009.01)

(52) U.S. Cl.
CPC ...... *H04W 72/1278* (2013.01); *H04W 72/1284* (2013.01); *H04W 72/0413* (2013.01)
USPC ............................................ 370/344; 370/336

(58) Field of Classification Search
USPC ................................................... 370/344, 336
See application file for complete search history.

(56) References Cited

U.S. PATENT DOCUMENTS

| 7,237,035 B1 * | 6/2007 | Damle .......................... 709/236 |
| 7,774,493 B1 * | 8/2010 | Damle .......................... 709/236 |
| 2001/0024952 A1 | 9/2001 | Herrmann et al. |
| 2008/0081651 A1 | 4/2008 | Kuroda et al. |
| 2008/0187068 A1 * | 8/2008 | Hashimoto et al. ........... 375/295 |
| 2008/0198795 A1 * | 8/2008 | Kim et al. ...................... 370/328 |
| 2009/0124211 A1 * | 5/2009 | Itoh et al. ........................ 455/69 |

FOREIGN PATENT DOCUMENTS

| EP | 1 784 036 A1 | 5/2007 |
| EP | 1784036 A1 * | 5/2007 .............. H04Q 7/38 |
| JP | 2005-94750 A | 4/2005 |

(Continued)

OTHER PUBLICATIONS

Examination Report for Singapore Application No. 200905738-1, mailed on Dec. 17, 2010 (6 pages).

(Continued)

Primary Examiner — Kenny Lin
(74) Attorney, Agent, or Firm — Osha Liang LLP

(57) ABSTRACT

A mobile station is configured to send a base station a buffer status report explicitly indicating that the amount of a transmission signal in a buffer of the mobile station has become zero. This configuration makes it possible to efficiently allocate radio resources of an uplink shared channel and thereby to increase uplink capacity.

11 Claims, 19 Drawing Sheets

(56) References Cited

FOREIGN PATENT DOCUMENTS

| WO | 2005/109690 A1 | 11/2005 |
|---|---|---|
| WO | 2006/016457 A1 | 2/2006 |
| WO | 2006098440 A1 | 9/2006 |

OTHER PUBLICATIONS

Japanese Office Action for Application No. 2009-502489, mailed on Mar. 23, 2010 (5 pages).
NTT DoCoMo and Fujitsu, Persistent Scheduling in E-UTRA, 3GPP TSG-RAN WG1 Meeting #49, May 11, 2007, R1-072437, URL, <ftp://ftp.3gpp.org/tsg_ran/WG1_RL1/TSGR1_49/Docs/R1-072437.zip>.
International Search Report w/translation from PCT/JP2008/052317 dated May 20, 2008 (3 pages).
Written Opinion from PCT/JP2008/052317 dated May 20, 2008 (5 pages).
3GPP TR 25.814 V7.0.0; "Physical Layer Aspects for Evolved Universal Terrestrial Radio Access (UTRA)"; Jun. 2006 (126 pages).
3GPP TSG RAN WG Meeting #47bis, R1-070103; "Downlink L1/L2 Control Signaling Channel Structure: Coding"; Sorrento, Italy; Jan. 15-19, 2007 (17 pages).
3GPP TS 25.309 V6.6.0; "FDD Enhanced Uplink; Overall Description; Stage 2"; Mar. 2006 (34 pages).
3GPP TS 25.321, V6.8.0; "Medium Access Control (MAC) Protocol Specification"; Mar. 2006 (91 pages).
TSG-RAN WG1 LTE AdHoc, R1-060099; "Persistent Scheduling for E-UTRA"; Helsinki, Finland; Jan. 23-25, 2006 (2 pages).
3GPP TSG RAN WG2 Meeting #59bis; R2-074059; "MAC Happy Bits for UL"; Ericsson; Shanghai, China; Oct. 8-12, 2007 (6 pages).
Patent Abstracts of Japan; Publication No. 2005-094750 dated Apr. 7, 2005; Samsung Electronics Co. Ltd. (1 page).
Japanese Office Action with English translation for corresponding Application No. 2010-027769, mailed on May 29, 2012 (7 pages).
3GPP TSG-RAN WG2 Meeting #46bis; R2-050852; "Relative Buffer Status Reporting"; LG Electronics, Inc.; Beijing, China; Apr. 4-8, 2005 (3 pages).
3GPP TSG RAN WG1 Meeting #47bis; R1-070098; "Persistent Scheduling in E-UTRA"; NTT DoCoMo, Mitsubishi Electric, NEC; Sorrento, Italy; Jan. 15-19, 2007 (5 pages).
Japanese Office Action for Application No. 2010-027769, mailed on Dec. 25, 2012 (4 pages).
Japanese Office Action for Application No. 2010-027769, mailed on Aug. 28, 2012 (4 pages).
Ericsson, "E-DCH Scheduling—UE Request Content," TSG-RAN Working Group 2 meeting #45, Tdoc R2-042441, Shin Yokohama, Japan, Nov. 15-19, 2004.
Extended European Search Report from PCT/JP2008/052317 dated Nov. 8, 2013 (11 pages).
3GPP TSG RAN WG1 Meeting #48, R1-070861, "Persistent Scheduling in E-UTRA", St. Louis, USA, Feb. 12-16, 2007 (5 pages).
3GPP TSG RAN WG1 #46bis, R1-062981 (R1-062618), "Persistent Scheduling for E-UTRA VoIP and Control Channel Considerations", Seoul, Korea, Oct. 9-13, 2006 (15 pages).
3GPP TSG GERAN #13, GP-030186, "A comparison of streaming services over FLO and EGPRS", San Antonio, Texas, USA, Feb. 3-7, 2003 (8 pages).

\* cited by examiner

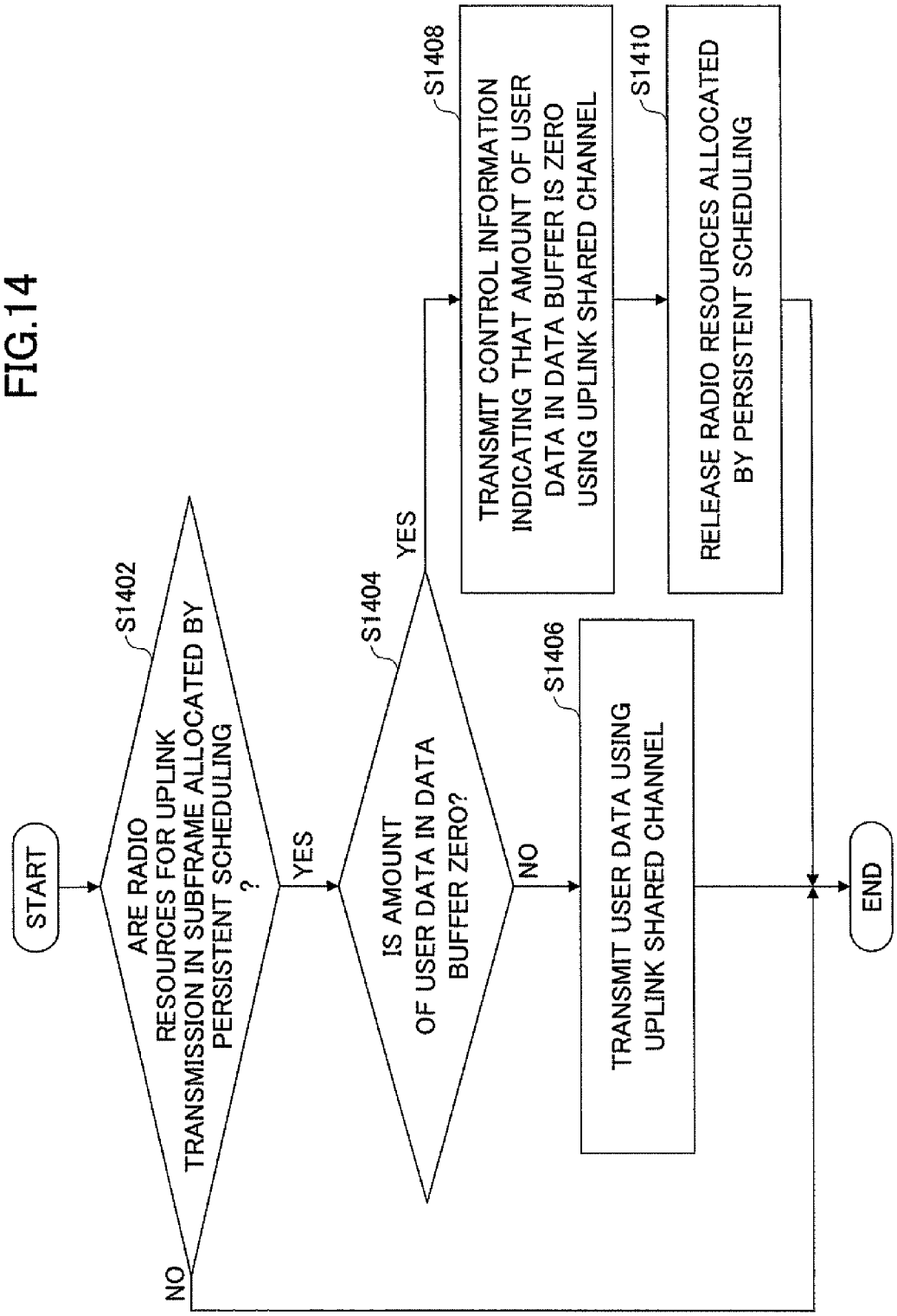

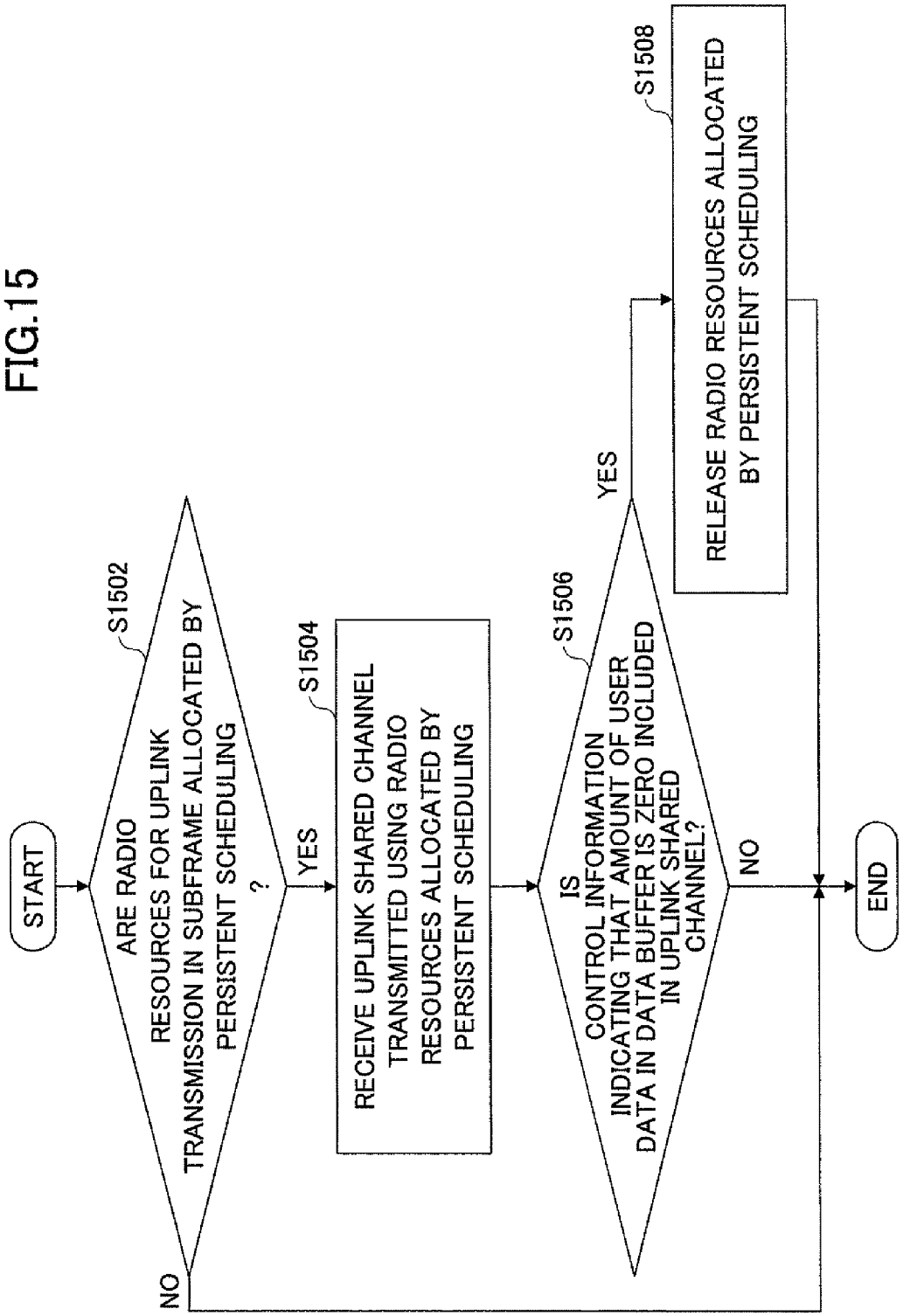

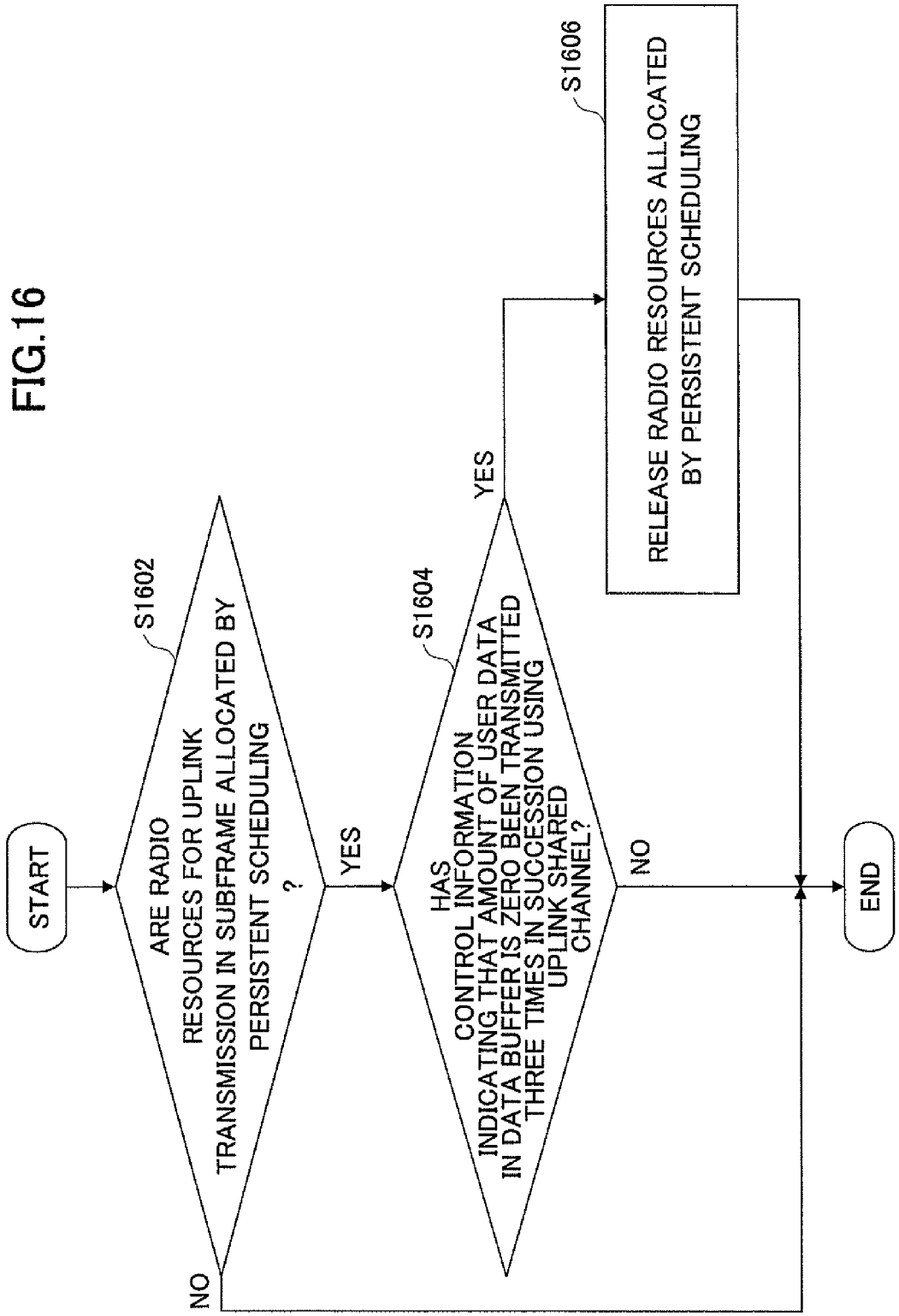

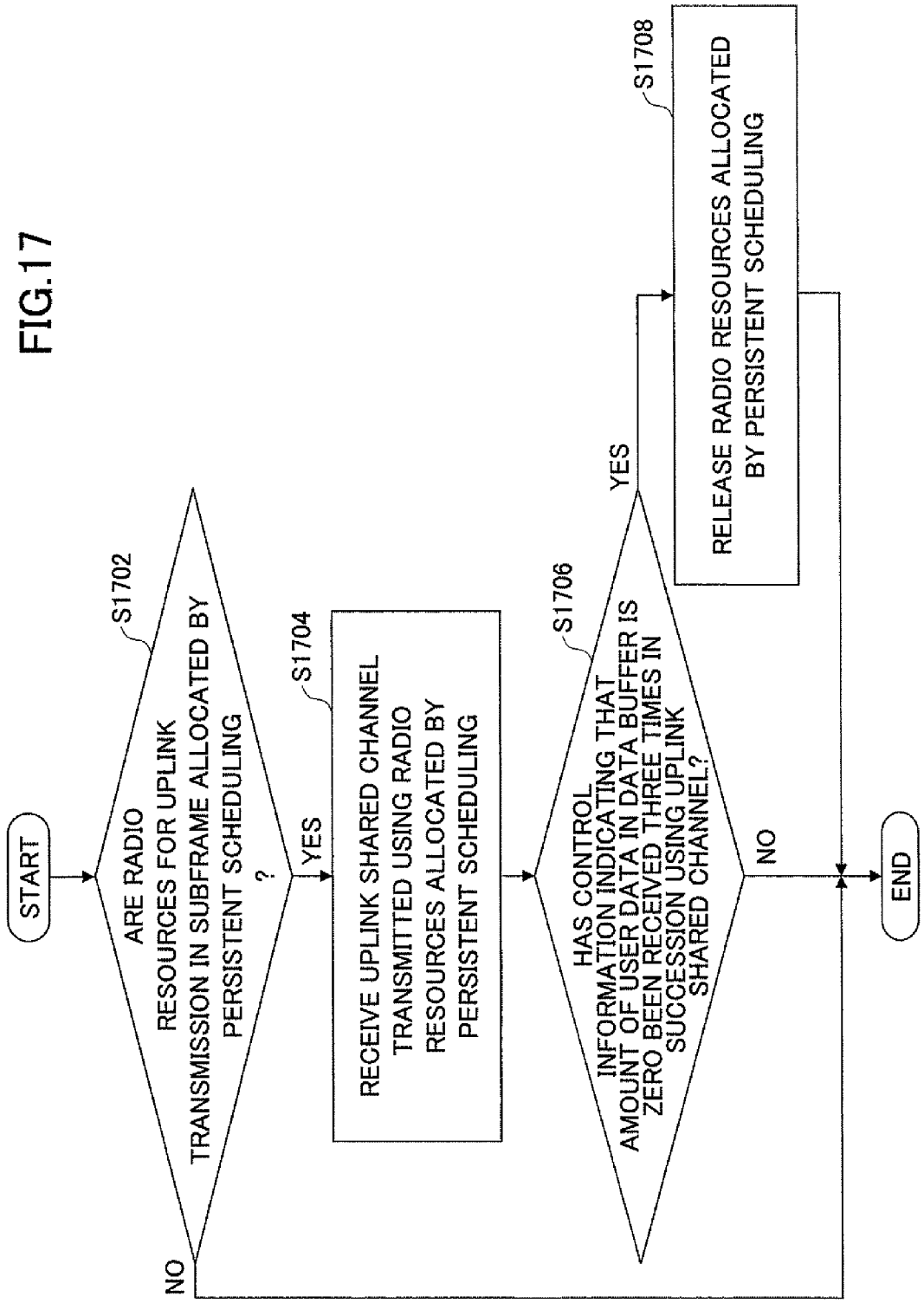

MOBILE STATION, BASE STATION, RADIO COMMUNICATION SYSTEM, AND COMMUNICATION CONTROL METHOD

TECHNICAL FIELD

The present invention generally relates to a radio communication system. More particularly, the present invention relates to a base station, a mobile station, a radio communication system, and a communication control method.

BACKGROUND ART

A successor communication system to W-CDMA and HSDPA, i.e., Long Term Evolution (LTE), is currently being discussed by 3GPP that is a standardization group for W-CDMA. In LTE, orthogonal frequency division multiplexing (OFDM) is to be used as a downlink radio access method and single-carrier frequency division multiple access (SC-FDMA) is to be used as an uplink radio access method (see, for example, 3GPP TR 25.814 (V7.0.0), "Physical Layer Aspects for Evolved UTRA," June 2006).

In OFDM, a frequency band is divided into multiple narrow frequency bands (subcarriers) and data are transmitted on the subcarriers. The subcarriers are densely arranged along the frequency axis such that they partly overlap each other but do not interfere with each other. This approach enables high-speed transmission and improves frequency efficiency.

In SC-FDMA, a frequency band is divided into multiple frequency bands and the frequency bands are allocated to different terminals for transmission in order to reduce interference between the terminals. Also, SC-FDMA reduces variation of the transmission power and therefore makes it possible to reduce power consumption of terminals and to achieve wide coverage.

In uplink and downlink of LTE, one or more physical channels are shared by multiple mobile stations for communication. A channel shared by multiple mobile stations is generally called a shared channel. In LTE, a physical uplink shared channel (PUSCH) is used for uplink and a physical downlink shared channel (PDSCH) is used for downlink.

In a communication system employing shared channels, it is necessary to report (or signal) allocation information of the shared channels to mobile stations for each subframe (1 ms in LTE). In LTE, a control channel used to report the allocation information (signaling) is called a physical downlink control channel or a downlink (DL) L1/L2 control channel. The physical downlink control channel, for example, includes a downlink (DL) L1/L2 control format indicator, downlink (DL) scheduling information, acknowledgement information (ACK/NACK), an uplink (UL) scheduling grant, an overload indicator, and a transmission power control command bit (see, for example, R1-070103, Downlink L1/L2 Control Signaling Channel Structure: Coding). The DL L1/L2 control format indicator is also called a physical control format indicator channel (PCFICH) and the ACK/NACK is also called a physical hybrid ARQ indicator channel (PHICH). The PCFICH and the PHICH may be defined as independent physical channels instead of as components of the PDCCH. The DL scheduling information may also be called a downlink scheduling grant or downlink assignment information.

The DL scheduling information and the UL scheduling grant are used to report (signal) allocation of shared channels to mobile stations. The DL scheduling information, for example, includes downlink resource block allocation information, UE IDs, the number of streams, information regarding precoding vectors, data sizes, modulation schemes, and information regarding hybrid automatic repeat request (HARQ) for a downlink shared channel. The UL scheduling grant, for example, includes uplink resource block allocation information, UE IDs, data sizes, modulation schemes, uplink transmission power information, and information regarding a demodulation reference signal used in uplink MIMO for an uplink shared channel.

Below, an exemplary uplink communication process using a shared channel is described.

In uplink, the base station selects mobile stations allowed to communicate using a shared channel in each subframe (1 ms) and requests the selected mobile stations via the uplink scheduling grant to communicate using the shared channel. The selected mobile stations in turn transmit the shared channel based on the uplink scheduling grant. Then, the base station receives and decodes the shared channel transmitted from the mobile stations. In the above communication process, selecting mobile stations (user devices) allowed to communicate using the shared channel is called "scheduling".

In the process, the base station cannot directly determine the amount of data stored in a buffer of each mobile station which are to be transmitted using an uplink shared channel. Therefore, for example, each mobile station transmits a buffer status report indicating the status of the buffer (buffer status) of the mobile station to the base station. In HSUPA, for example, the mobile station reports UE buffer occupancy (in bytes) to the base station. The UE buffer occupancy is a signal for reporting a buffer status of the mobile station, i.e., the amount of a signal in a buffer of the mobile station (see, for example, 3GPP TS 25.309 (V6.6.0), "FDD Enhanced Uplink, Overall description, Stage 2", 9.3.1.1.1, 2006-03; and 3GPP TS 25.321 (V6.8.0), "Medium Access Control (MAC) protocol specification", 9.2.5.3.2, 2006-03).

DISCLOSURE OF INVENTION

Problems to be Solved by the Invention

However, the above background art technologies have problems as described below.

The base station cannot accurately determine the buffer status of the mobile station based on the buffer status report from the mobile station. Therefore, it may happen that the base station requests the mobile station by using the uplink scheduling grant to transmit an uplink shared channel even when the amount of a transmission signal in the buffer of the mobile station is zero. This results in waste of uplink radio resources and reduces system capacity.

One object of the present invention is to solve or reduce one or more of the above problems and to provide a base station, a mobile station, a radio communication system, and a communication control method that make it possible to increase uplink capacity by transmitting from the mobile station to the base station a buffer status report explicitly indicating that the amount of a transmission signal in a buffer of the mobile station has become zero.

Means for Solving the Problems

An aspect of the present invention provides a mobile station communicating with a base station in a radio communication system and including a transmitting unit configured to transmit a first signal to the base station. The transmitting unit is configured to transmit a second signal in addition to the first signal to the base station if the amount of the first signal in a buffer of the mobile station is to become zero after the transmission of the first signal.

An aspect of the present invention provides a mobile station communicating with a base station in a radio communication system and including a transmitting unit. The transmitting unit is configured, if the amount of a first signal in a buffer of the mobile station is zero, to transmit a second signal to the base station.

An aspect of the present invention provides a mobile station in a radio communication system that includes the mobile station and a base station communicating with the mobile station and employing a scheduling scheme for allocating radio resources to the mobile station at intervals. The mobile station includes a transmitting unit configured to transmit a first signal to the base station according to the scheduling scheme and configured to transmit a second signal to the base station if the amount of the first signal in a buffer of the mobile station is zero; and a releasing unit configured to release the radio resources allocated for the first signal after the transmission of the second signal.

An aspect of the present invention provides a base station communicating with a mobile station in a radio communication system. The base station includes a requesting unit configured to request the mobile station to transmit a first signal. The requesting unit is configured not to request the mobile station to transmit the first signal if a control signal reporting that the amount of the first signal in a buffer of the mobile station is zero is received from the mobile station.

An aspect of the present invention provides a base station communicating with a mobile station in a radio communication system. The base station includes a requesting unit configured to request the mobile station to transmit a first signal. The requesting unit is configured not to request the mobile station to transmit the first signal if padding bits are included in the first signal transmitted from the mobile station.

An aspect of the present invention provides a base station communicating with a mobile station in a radio communication system and employing a scheduling scheme for allocating radio resources to the mobile station at intervals. The base station includes a receiving unit configured to receive a first signal from the mobile station according to the scheduling scheme; and a releasing unit configured to release the radio resources allocated for the first signal if a second signal reporting that the amount of the first signal in a buffer of the mobile station is zero is received from the mobile station.

An aspect of the present invention provides a communication control method in a radio communication system including a mobile station and a base station communicating with the mobile station. The method includes a first step, performed by the base station, of requesting the mobile station to transmit a first signal to the base station; and a second step, performed by the mobile station, of transmitting a second signal in addition to the first signal to the base station if the amount of the first signal in a buffer of the mobile station is to become zero.

An aspect of the present invention provides a communication control method performed by a mobile station in a radio communication system that includes the mobile station and a base station communicating with the mobile station and employing a scheduling scheme for allocating radio resources to the mobile station at intervals. The method includes a first step of transmitting a first signal to the base station according to the scheduling scheme; a second step of transmitting a second signal to the base station if the amount of the first signal in a buffer of the mobile station is zero; and a third step of releasing the radio resources allocated for the first signal after the transmission of the second signal.

An aspect of the present invention provides a communication control method performed by a base station communicating with a mobile station in a radio communication system and employing a scheduling scheme for allocating radio resources to the mobile station at intervals. The method includes a first step of receiving a first signal from the mobile station according to the scheduling scheme; and a second step of releasing the radio resources allocated for the first signal if a second signal reporting that the amount of the first signal in a buffer of the mobile station is zero is received from the mobile station.

Advantageous Effect of the Invention

An aspect of the present invention provides a base station, a mobile station, a radio communication system, and a communication control method that make it possible to increase uplink capacity by transmitting from the mobile station to the base station a buffer status report explicitly indicating that the amount of a transmission signal in a buffer of the mobile station has become zero.

BRIEF DESCRIPTION OF THE DRAWINGS

FIG. 14 is a flowchart showing a communication control method according to an embodiment of the present invention;

FIG. 15 is a flowchart showing a communication control method performed by a base station according to an embodiment of the present invention;

FIG. 16 is a flowchart showing a communication control method performed by a mobile station according to an embodiment of the present invention; and FIG. 17 is a flowchart showing a communication control method performed by a base station according to an embodiment of the present invention.

EXPLANATION OF REFERENCES

Figure 1:
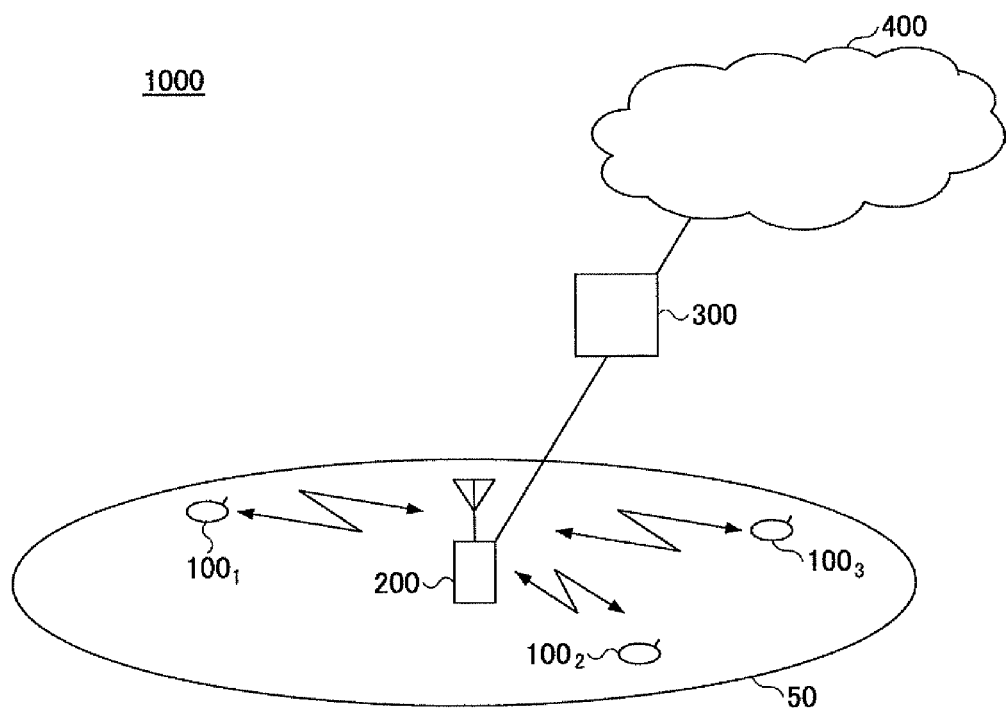
FIG. 1 is a drawing illustrating a configuration of a radio communication system according to an embodiment of the present invention.

50 Cell
$100_1$, $100_2$, $100_3$, $100_n$ Mobile station
102 Transceiver antenna
104 Amplifier
106 Transceiver unit
108 Baseband signal processing unit
110 Application unit
1081 Layer 1 processing unit
1082 MAC processing unit
1083 RLC processing/buffering unit
200 Base station
202 Transceiver antenna
204 Amplifier
206 Transceiver unit
208 Baseband signal processing unit
210 Call processing unit
212 Transmission path interface
2081 Layer 1 processing unit
2082 MAC processing unit
2083 RLC processing unit
300 Access gateway
400 Core network

BEST MODE FOR CARRYING OUT THE INVENTION

The best mode for carrying out the invention is described based on the following embodiments with reference to the accompanying drawings. Throughout the accompanying drawings, the same reference numbers are used for parts having the same functions, and overlapping descriptions of those parts are omitted.

A radio communication system 1000 including mobile stations and a base station according to an embodiment of the present invention is described below with reference to FIG. 1.

The radio communication system 1000 is based on, for example, Evolved UTRA and UTRAN (also called Long Term Evolution or Super 3G). The radio communication system 1000 includes a base station (eNode B: eNB) 200 and mobile stations $100_n$ ($100_1$, $100_2$, $100_3$, . . . $100_n$; n is an integer greater than 0). The base station 200 is connected to an upper node such as an access gateway 300 and the access gateway 300 is connected to a core network 400. The mobile stations $100_n$ are in a cell 50 and communicate with the base station 200 according to Evolved UTRA and UTRAN.

The mobile stations $100_n$ ($100_1$, $100_2$, $100_3$ . . . $100_n$) have the same configuration and functions and are therefore called the mobile station $100_n$ or the mobile stations $100_n$ in the descriptions below unless otherwise mentioned. In the descriptions below, mobile stations are used as examples of user equipment (UE) communicating with a base station. However, user equipment communicating with a base station may also include fixed terminals.

In the radio communication system 1000, orthogonal frequency division multiplexing (OFDM) is used as the downlink radio access method and single-carrier frequency division multiple access (SC-FDMA) is used as the uplink radio access method. As described above, OFDM is a multicarrier transmission scheme where a frequency band is divided into multiple narrow frequency bands (subcarriers) and data are mapped to the subcarriers for transmission. Meanwhile, SC-FDMA is a single-carrier transmission scheme where a frequency band is divided into multiple frequency bands and the frequency bands are allocated to different terminals in order to reduce interference between the terminals.

Communication channels used in Evolved UTRA and UTRAN are described below.

For downlink, a physical downlink shared channel (PDSCH) shared by the mobile stations $100_n$ and a physical downlink control channel (PDCCH) are used. The physical downlink control channel is also called a downlink L1/L2 control channel. The physical downlink shared channel is used to transmit user data, i.e., a normal data signal. The physical downlink control channel is used to transmit, for example, downlink (DL) scheduling information, acknowledgement information (ACK/NACK), an uplink (UL) scheduling grant, an overload indicator, and a transmission power control command bit. The DL scheduling information, for example, includes IDs of users allowed to communicate using the physical downlink shared channel and transport format information for the user data such as data sizes, modulation schemes, HARQ information, and downlink resource block allocation information. The DL scheduling information may also be called a downlink scheduling grant or downlink assignment information.

The UL scheduling grant, for example, includes IDs of users allowed to communicate using the physical uplink shared channel and transport format information for the user data such as data sizes, modulation schemes, uplink resource block allocation information, and transmission power information for an uplink shared channel. Here, uplink resource blocks correspond to frequency resources and may also be called resource units.

The acknowledgement information (ACK/NACK) is acknowledgement information for an uplink shared channel. A physical channel used to transmit the acknowledgement information (ACK/NACK) may be called a physical hybrid ARQ indicator channel (PHICH). The PHICH may be defined as an independent physical channel instead of as a component of the PDCCH.

For uplink, the physical uplink shared channel (PUSCH) shared by the mobile stations $100_n$ and a physical uplink control channel are used. The physical uplink shared channel is used to transmit user data, i.e., a normal data signal. The physical uplink control channel is used to transmit a downlink channel quality indicator (CQI) used for scheduling and adaptive modulation and coding (AMC) of the physical downlink shared channel, and acknowledgement information for the physical downlink shared channel. The acknowledgement information includes either acknowledgement (ACK) indicating normal reception of a transmitted signal or negative acknowledgement (NACK) indicating abnormal reception of a transmitted signal.

The physical uplink control channel may also be used to transmit, in addition to the CQI and the acknowledgement information, a scheduling request for requesting allocation of resources of an uplink shared channel and a release request used in persistent scheduling. Here, allocation of resources of an uplink shared channel indicates a process where a base station reports to a mobile station by using the physical downlink control channel in a subframe that the mobile station is allowed to communicate using the uplink shared channel in a subsequent subframe.

The mobile station $100_n$ of this embodiment is described below with reference to FIG. 2.

Figure 2:
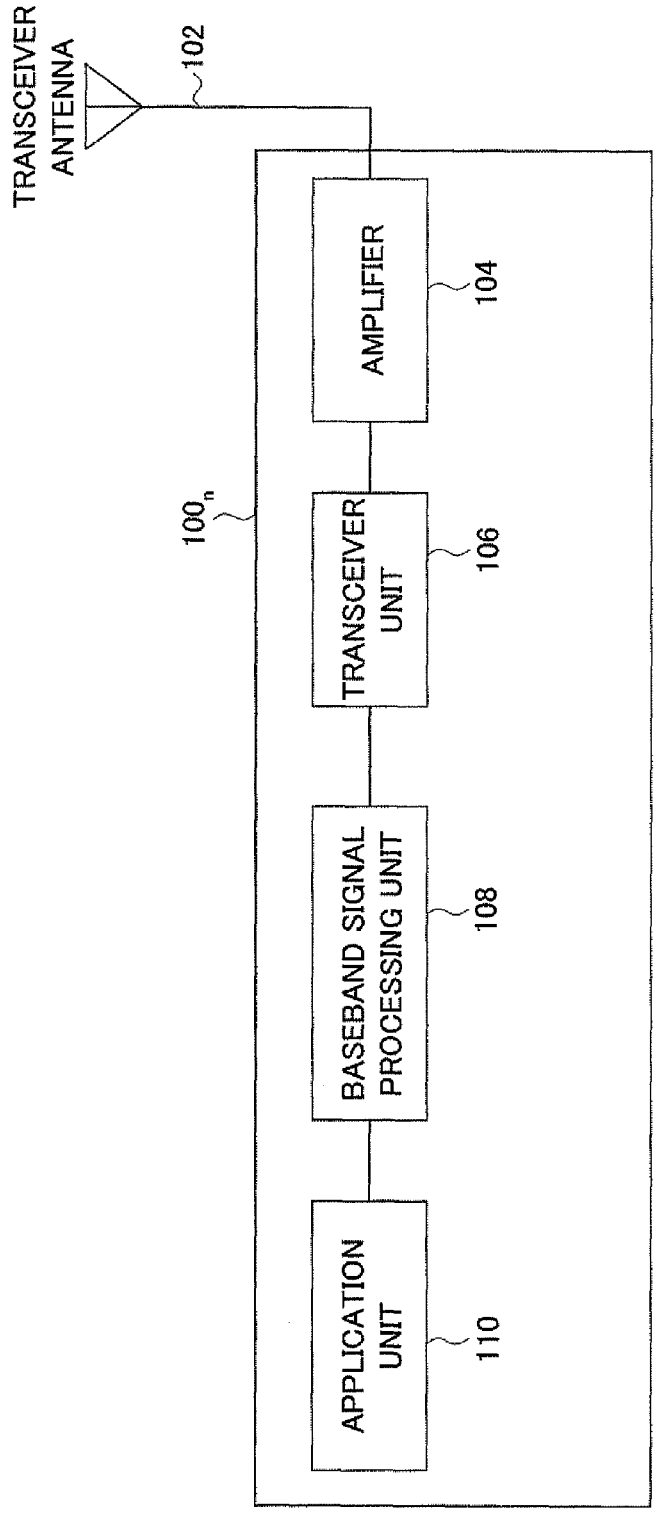
FIG. 2 is a partial block diagram of a mobile station according to an embodiment of the present invention.

As shown in FIG. 2, the mobile station $100_n$ includes a transceiver antenna 102, an amplifier 104, a transceiver unit 106, a baseband signal processing unit 108, and an application unit 110.

When a radio frequency signal including downlink data is received by the transceiver antenna 102, the amplifier 104 amplifies the radio frequency signal and the transceiver unit 106 performs frequency conversion to convert the radio frequency signal into a baseband signal. Then, the baseband signal processing unit 108 performs, for the baseband signal, FFT processing, error correction decoding, a reception process in retransmission control, RLC layer reception processing, PDCP layer processing, and so on. Downlink user data in the downlink data are input to the application unit 110. The application unit 110 performs processing regarding upper layers higher than the physical layer, the MAC layer, the RLC layer, and the PDCP layer.

Meanwhile, uplink user data are input from the application unit 110 to the baseband signal processing unit 108. The baseband signal processing unit 108 performs, for the uplink user data, PDCP layer processing; RLC layer transmission processing such as data segmentation/concatenation and a transmission process in radio link control (RLC) retransmission control; MAC layer transmission processing such as a transmission process in Hybrid ARQ (HARQ); channel coding; inverse fast Fourier transform (IFFT) processing; and so on. Then, the baseband signal processing unit 108 inputs the uplink user data (baseband signal) to the transceiver unit 106. The transceiver unit 106 performs frequency conversion to convert the baseband signal input from the baseband signal processing unit 108 into a radio frequency signal. The radio frequency signal is amplified by the amplifier 104 and transmitted from the transceiver antenna 102.

Examples of the user data include IP packets in Web browsing, FTP, and VoIP, and a control signal for radio resource control (RRC). Logical channels used for the user data include a DTCH and a DCCH.

Figure 3:
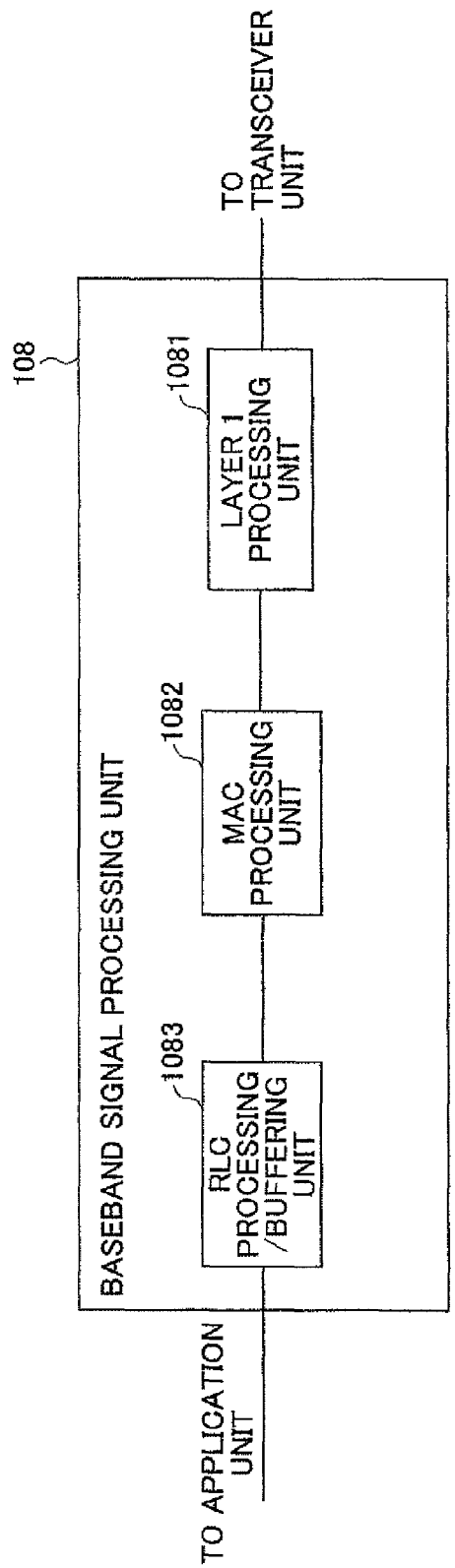
FIG. 3 is a block diagram of a baseband signal processing unit of a mobile station according to an embodiment of the present invention.

A configuration of the baseband signal processing unit 108 is described below with reference to FIG. 3.

The baseband signal processing unit 108 includes a layer 1 processing unit 1081, a medium access control (MAC) processing unit 1082, and a radio link control (RLC) processing/buffering unit 1083.

The layer 1 processing unit 1081 performs channel decoding and FFT processing on a received downlink signal.

The layer 1 processing unit 1081 also demodulates and decodes a physical downlink control channel in the received downlink signal and inputs the decoding results to the MAC processing unit 1082. Specifically, the layer 1 processing unit 1081 demodulates and decodes downlink scheduling information and an uplink scheduling grant in the physical downlink control channel and inputs the decoding results to the MAC processing unit 1082.

Further, when uplink user data are to be transmitted in a given subframe, the layer 1 processing unit 1081 receives the user data from the MAC processing unit 1082. As described later, MAC-layer control information may be attached to the uplink user data. The layer 1 processing unit 1081 performs coding, data modulation, DFT processing, subcarrier mapping, IFFT processing, etc. on the uplink user data and inputs the processed uplink user data as a baseband signal to the transceiver unit 106. The MAC layer control information may also be called MAC control elements.

The MAC processing unit 1082 receives the decoded downlink scheduling information and the decoded uplink scheduling grant from the layer 1 processing unit 1081. Below, transmission of an uplink shared channel, which is particularly relevant to this embodiment of the present invention, is mainly discussed.

The MAC processing unit 1082, based on the uplink scheduling grant, performs transmission processing such as transport format determination and MAC-layer retransmission control (HARQ) for the uplink user data. Specifically, if transmission using an uplink shared channel is requested by the uplink scheduling grant received from the base station 200 via the layer 1 processing unit 1081, the MAC processing unit 1082 performs transmission processing such as transport format determination and retransmission control (HARQ) for user data in a data buffer of the mobile station $100_n$, and inputs the user data to the layer 1 processing unit 1081. The data buffer of the mobile station $100_n$ is provided, for example, in the RLC processing/buffering unit 1083. In this case, the MAC processing unit 1082 receives the user data from the data buffer in the RLC processing/buffering unit 1083 and performs the transmission processing as described above. The data buffer may be provided in the MAC processing unit 1082 instead of in the RLC processing/buffering unit 1083.

If the amount of user data in the data buffer of the RLC processing/buffering unit 1083 is expected to become zero after transmitting the user data in a given subframe, the MAC processing unit 1082 attaches control information indicating the status of the data buffer (data buffer status) to the user data, and then performs transmission processing such as transport format determination and retransmission control (HARQ). The control information, for example, indicates the status of a MAC-layer data buffer. More particularly, the control information may indicate that the amount of user data in the data buffer is zero. The MAC-layer control information may be called MAC control elements and the control information indicating the status of the MAC-layer data buffer may be one of the MAC control elements.

In short, scheduling information including control information indicating a buffer status is transmitted when transmission of an uplink shared channel is requested by the uplink scheduling grant and a UL-SCH buffer status is to become zero after the transmission of the uplink shared channel. Accordingly, the control information indicates that the UL-SCH buffer status is zero. The scheduling information may include the control information indicating a buffer status and UE power headroom (UPH) indicating transmission power of the mobile station $100_n$.

The UL-SCH buffer status after transmission of an uplink shared channel becomes zero, for example, when the amount of user data in the data buffer is less than a value obtained by subtracting a header size and the size of the control information indicating the buffer status from a data size specified by the uplink scheduling grant.

Figure 4:
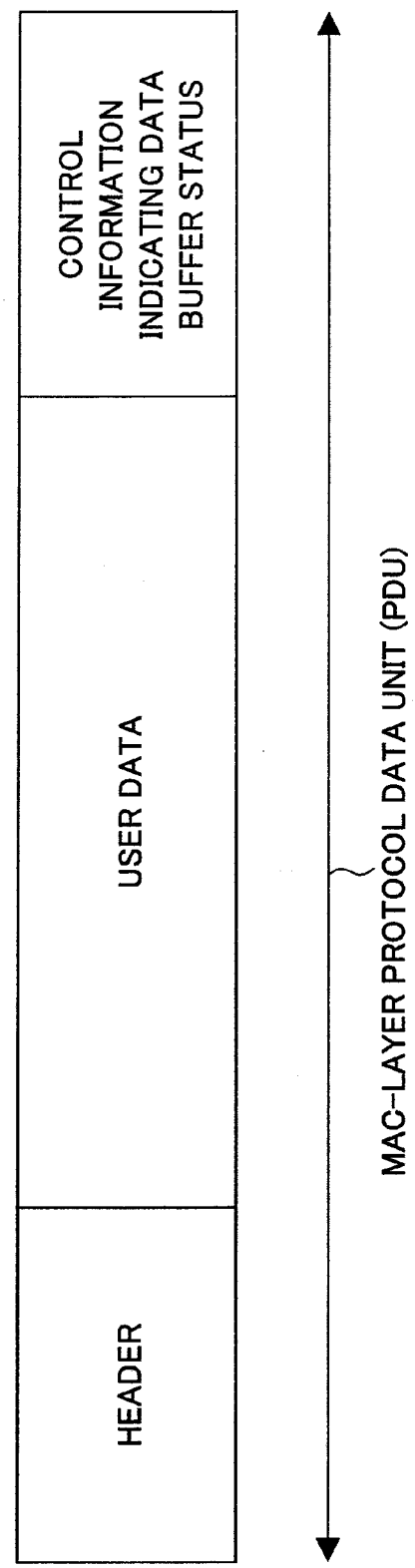
FIG. 4 is a drawing illustrating a structure of a MAC-layer PDU where user data are mapped according to an embodiment of the present invention.

In this case, a MAC-layer protocol data unit (MAC PDU) where user data are mapped includes, for example, a MAC layer header, user data, and the control information indicating a data buffer status as shown in FIG. 4. In addition to the MAC layer header, the user data, and the control information indicating a data buffer status, the MAC PDU may include padding bits to adjust the data size to a multiple of bytes.

The MAC processing unit 1082 may be configured to determine whether to attach the control information indicating a data buffer status to user data based on the type of the user data when the amount of user data in the data buffer of the RLC processing/buffering unit 1083 is expected to become zero after transmission of the user data in a given subframe. For example, the MAC processing unit 1082 may be configured to attach the control information indicating a data buffer status to user data if the type of the user data is a best effort packet and not to attach the control information to user data if the type of the user data is a control signal such as a dedicated control channel (DCCH), streaming user data, or gaming user data. In this case, for example, the MAC processing unit 1082 does not attach the control information indicating a data buffer status to user data if the type of the user data is gaming user data even if the amount of user data in the data buffer is to become zero. The type of user data may instead be determined based on a logical channel type or a radio bearer.

Also, the MAC processing unit 1082 may be configured to perform transmission processing such as transport format determination and retransmission control (HARQ) to transmit only the control information indicating a data buffer status if transmission using an uplink shared channel is requested by the uplink scheduling grant received from the base station 200 via the layer 1 processing unit 1081 but the amount of user data in the data buffer of the RLC processing/buffering unit 1083 is already zero. Also in this case, the control information indicates the status of the MAC layer data buffer, and particularly indicates that the amount of user data in the data buffer is zero.

In short, scheduling information including control information indicating a buffer status is transmitted when transmission of an uplink shared channel is requested by the uplink scheduling grant and the current UL-SCH buffer status is zero. Accordingly, the control information indicates that the UL-SCH buffer status is zero. The scheduling information may include the control information indicating a buffer status and UE power headroom (UPH) indicating transmission power of the mobile station $100_n$.

Figure 5:
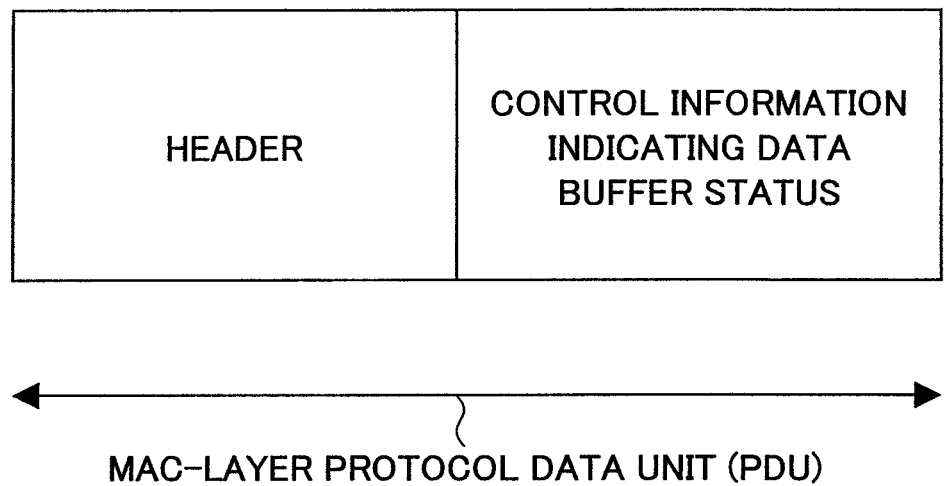
FIG. 5 is a drawing illustrating a structure of a MAC-layer PDU where control information indicating the status of a data buffer is mapped according to an embodiment of the present invention.

In this case, a MAC-layer protocol data unit (MAC PDU) where the control information indicating a data buffer status is mapped includes, for example, a MAC layer header and the control information indicating a data buffer status as shown in FIG. 5. In addition to the MAC layer header and the control information indicating a data buffer status, the MAC PDU may include padding bits to adjust the data size to a multiple of bytes.

The MAC processing unit 1082 may be configured to determine whether to transmit only the control information indicating a data buffer status based on the type of user data if transmission using an uplink shared channel is requested and the amount of user data in the data buffer of the RLC processing/buffering unit 1083 is already zero. For example, the MAC processing unit 1082 may be configured to transmit the control information indicating a data buffer status if the type of user data is a best effort packet and not to transmit the control information if the type of user data is a control signal such as a dedicated control channel (DCCH), streaming user data, or gaming user data. In this case, for example, the MAC processing unit 1082 does not transmit the control information indicating a data buffer status if the type of user data is gaming user data even if the amount of user data in the data buffer is zero. The type of user data may instead be determined based on a logical channel type or a radio bearer.

In the exemplary methods described above, the MAC processing unit 1082 transmits the control information indicating that the UL-SCH buffer status is 0 when transmission of an uplink shared channel is requested by the uplink scheduling grant and the UL-SCH buffer status is to become zero after the transmission of the uplink shared channel or when transmission of an uplink shared channel is requested by the uplink scheduling grant and the UL-SCH buffer status is already zero. However, in services such as gaming and VoIP where data with a small size are generated sporadically, the above methods necessitate transmission of the control information indicating a UL-SCH buffer status every time uplink data are transmitted. Meanwhile, after transmitting the control information indicating that the UL-SCH buffer status is zero, the mobile station $100_n$ has to transmit a scheduling request to request the base station 200 to transmit an uplink scheduling grant and thereby to resume uplink transmission. This causes delay in services such as gaming and VoIP and is therefore not preferable.

To solve this problem, the MAC processing unit 1082 may be configured to transmit the control information indicating that the UL-SCH buffer status is zero when, for example, the amount of data in the UL-SCH data buffer remains zero for a predetermined period of time. Specifically, the MAC processing 1082 may be configured to start a timer when the amount of data in the UL-SCH data buffer becomes zero and to transmit the control information indicating that the UL-SCH buffer status is zero if transmission of an uplink shared channel is requested by the uplink scheduling grant after the timer exceeds a predetermined period of time. For example, the MAC processing unit 1082 transmits the control information indicating that the UL-SCH buffer status is zero after 100 ms from when the amount of data in the UL-SCH data buffer becomes zero. Needless to add, the predetermined period of time is not limited to 100 ms.

Alternatively, the MAC processing unit 1082 may be configured to determine whether to transmit the control information indicating that the UL-SCH buffer status is zero based on the number of times the uplink scheduling grant is received while the amount of data in the UL-SCH data buffer is zero. For example, if the uplink scheduling grant is received three times after the amount of data in the UL-SCH data buffer becomes zero, the MAC processing unit 1082 includes the control information indicating that the UL-SCH buffer status is zero in an uplink shared channel corresponding to the third uplink scheduling grant and transmits the uplink shared channel. Needless to add, the number of times the uplink scheduling grant is received is not limited to three.

For downlink, the MAC processing unit 1082 performs, for example, a reception process in MAC-layer retransmission control for downlink user data based on downlink scheduling information from the layer 1 processing unit 1081.

The RLC processing/buffering unit 1083 performs RLC layer transmission processing such as data segmentation/concatenation and a transmission process in RLC retransmission control for uplink user data, and performs RLC layer reception processing such as data segmentation/concatenation and a reception process in RLC retransmission control for downlink user data. The RLC processing/buffering unit 1083 may be configured to perform PDCP layer processing in addition to the RLC layer processing described above.

As described above, the RLC processing/buffering unit 1083 includes a data buffer for buffering user data to be transmitted in uplink. When the MAC processing unit 1082 performs transmission processing for user data, the RLC processing/buffering unit 1083 transmits the user data in the data buffer to the MAC processing unit 1082. The data buffer may be an RLC layer buffer, a PDCP layer buffer, or a common buffer for the RLC layer and the PDCP layer.

In the above examples, the MAC processing unit 1082 attaches control information indicating a data buffer status to user data and then performs the transmission processing described above when the amount of user data in the data buffer of the RLC processing/buffering unit 1083 is expected to become zero after transmission of the user data in a given subframe. Alternatively, the MAC processing unit 1082 may be configured to attach padding bits to the user data and perform the above described transmission processing. The padding bits are used when the size of user data is less than the size of a MAC-layer protocol data unit (MAC PDU) where the user data are mapped to adjust the size of the user data to match the size of the MAC PDU. For example, the padding bits are all zero. In this case, a MAC-layer protocol data unit (MAC PDU) where user data are mapped includes, for example, a MAC layer header, user data, and padding bits.

Figure 7A:
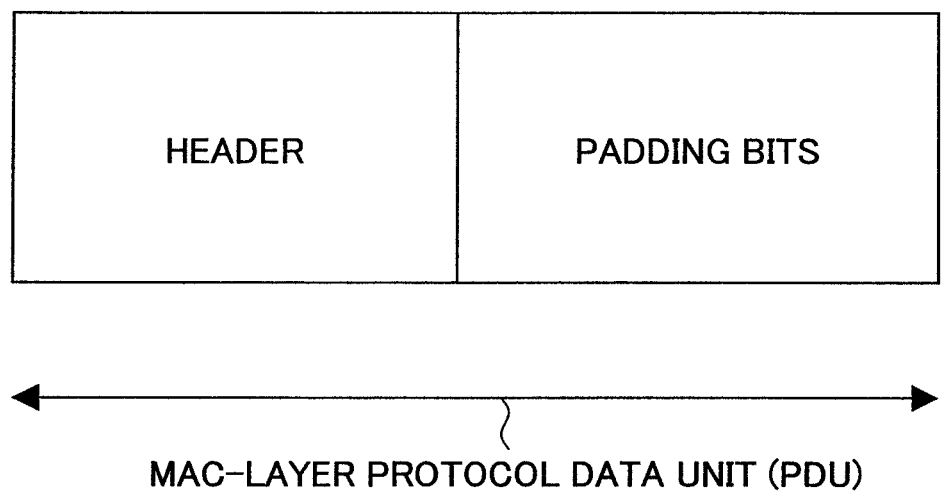
FIG. 7A is a drawing illustrating a structure of a MAC-layer PDU where control information indicating the status of a data buffer is mapped according to an embodiment of the present invention.

Also, the MAC processing unit 1082 may be configured to perform transmission processing as described above to transmit only the padding bits if transmission using an uplink shared channel is requested by the uplink scheduling grant received from the base station 200 via the layer 1 processing unit 1081 but the amount of user data in the data buffer of the RLC processing/buffering unit 1083 is already zero. In this case, a MAC-layer protocol data unit (MAC PDU) includes, for example, a MAC layer header and padding bits as shown in FIG. 7A.

Figure 7B:
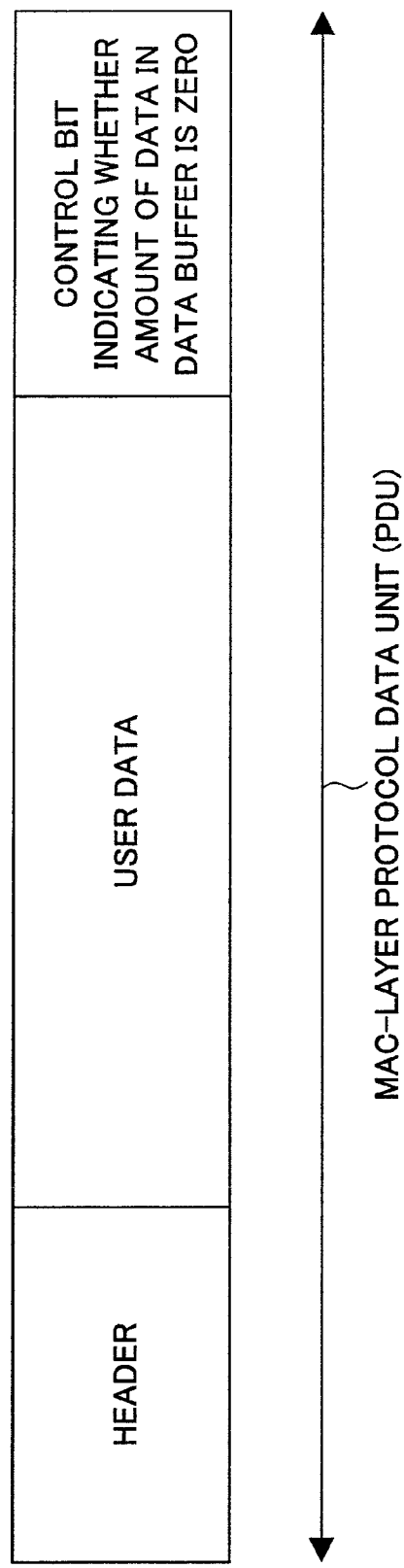
FIG. 7B is a drawing illustrating a structure of a MAC-layer PDU where user data are mapped according to an embodiment of the present invention.

In the above examples, the MAC processing unit 1082 attaches control information indicating a data buffer status to user data and performs the above described transmission processing when the amount of user data in the data buffer of the RLC processing/buffering unit 1083 is expected to become zero after transmission of the user data in a given subframe. Alternatively, the MAC processing unit 1082 may be configured to attach a control bit indicating whether the amount of data in the data buffer is zero to the user data instead of the control information indicating a data buffer status. Unlike the control information indicating various statuses of the data buffer, the control bit requires only one bit to indicate whether the amount of data in the data buffer is zero and therefore makes it possible to improve the transmission efficiency. However, the number of control bits is not limited to one. FIG. 7B shows an exemplary structure of a MAC PDU including the control bit.

Figure 7C:
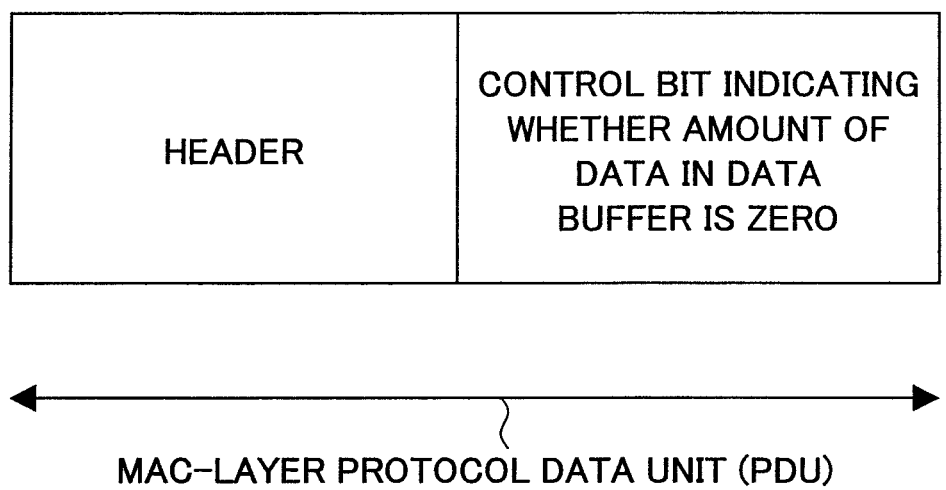
FIG. 7C is a drawing illustrating a structure of a MAC-layer PDU where user data are mapped according to an embodiment of the present invention.

Also, a MAC PDU as shown in FIG. 7C may be used to transmit only a control bit indicating whether the amount of data in the data buffer is zero if transmission using an uplink shared channel is requested by the uplink scheduling grant received from the base station 200 via the layer 1 processing unit 1081 but the amount of user data in the data buffer of the RLC processing/buffering unit 1083 is already zero.

Figure 8:
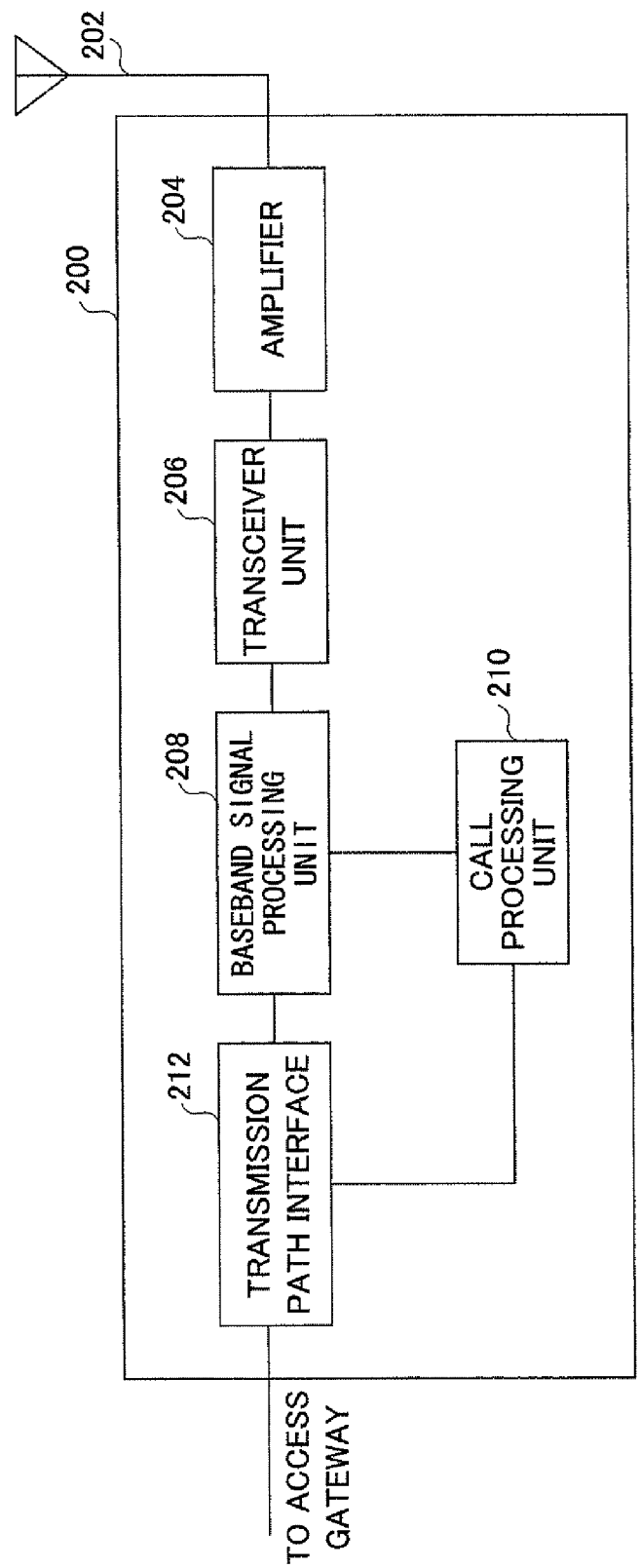
FIG. 8 is a partial block diagram of a base station according to an embodiment of the present invention.

The base station 200 of this embodiment is described below with reference to FIG. 8.

The base station 200 includes a transceiver antenna 202, an amplifier 204, a transceiver unit 206, a baseband signal processing unit 208, a call processing unit 210, and a transmission path interface 212.

Downlink user data to be transmitted from the base station 200 to the mobile station $100_n$ are sent from an upper node such as the access gateway 300 to the base station 200 and input to the baseband signal processing unit 208 via the transmission path interface 212.

The baseband signal processing unit 208 performs, for the downlink user data, PDCP layer processing; RLC layer transmission processing such as data segmentation/concatenation and a transmission process in radio link control (RLC) retransmission control; a transmission process in MAC retransmission control (e.g., HARQ); scheduling; selection of transport formats; channel coding; IFFT processing; and so on. Then, the baseband signal processing unit 208 inputs the downlink user data (baseband signal) to the transceiver unit 206. The baseband signal processing unit 208 also performs transmission processing such as channel coding and IFFT processing on a physical downlink control channel and inputs the physical downlink control channel to the transceiver unit 206.

The transceiver unit 206 performs frequency conversion to convert the baseband signal input from the baseband signal processing unit 208 into a radio frequency signal. The radio frequency signal is amplified by the amplifier 204 and transmitted from the transceiver antenna 202.

Meanwhile, when a radio frequency signal including uplink data transmitted from the mobile stations $100_n$ and $100_m$ to the base station 200 is received by the transceiver antenna 202, the amplifier 204 amplifies the radio frequency signal and the transceiver unit 206 performs frequency conversion to convert the radio frequency signal into a baseband signal. Then, the transceiver unit 206 inputs the baseband signal to the baseband signal processing unit 208.

For user data in the input baseband signal, the baseband signal processing unit 208 performs FFT processing, IDFT processing, error correction decoding, a reception process in MAC retransmission control, RLC layer reception processing, PDCP layer processing, and so on, and transmits the user data via the transmission path interface 212 to the access gateway 300.

Also, as described later, if control information indicating that the amount of user data in the data buffer of the mobile station $100_n$ is zero is included in the uplink shared channel in the received signal, the baseband signal processing unit 208 stops allocating uplink radio resources to the mobile station $100_n$. In other words, the baseband signal processing unit 208 refrains from transmitting the mobile station $100_n$ the uplink scheduling grant for requesting transmission of an uplink shared channel.

The call processing unit 210 performs call processing such as establishment and release of a communication channel, status management of the base station 200, and management of radio resources.

Figure 9:
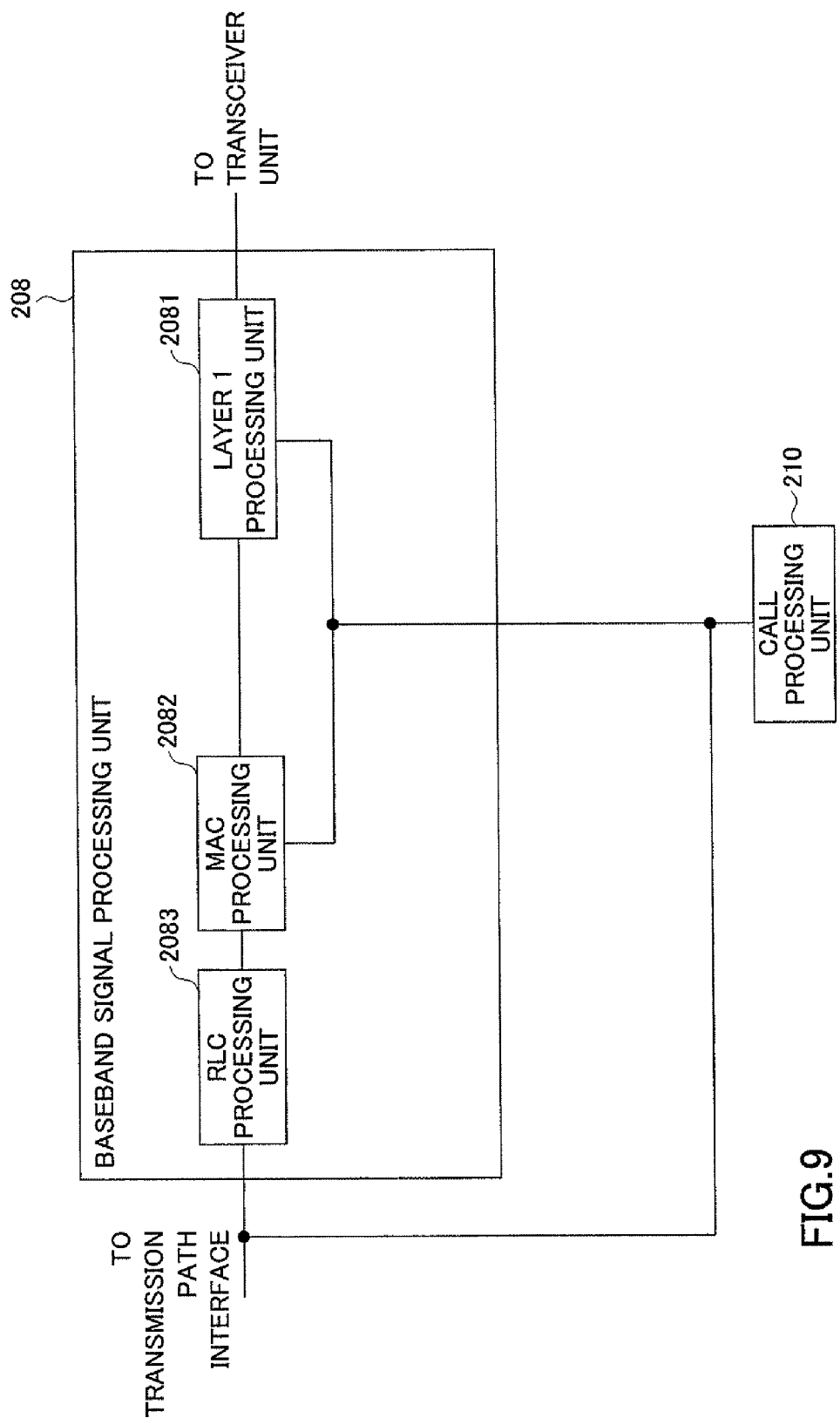
FIG. 9 is a block diagram of a baseband signal processing unit of a base station according to an embodiment of the present invention.

A configuration of the baseband signal processing unit 208 is described below with reference to FIG. 9.

The baseband signal processing unit 208 includes a layer 1 processing unit 2081, a MAC processing unit 2082, and an RLC processing unit 2083.

The layer 1 processing unit 2081 and the MAC processing unit 2082 of the baseband signal processing unit 208 and the call processing unit 210 are connected to each other.

The layer 1 processing unit 2081 performs channel coding and IFFT processing on downlink transmission data and performs channel decoding, IDFT processing, and FFT processing on uplink transmission data.

The layer 1 processing unit 2081 receives, from the MAC processing unit 2082, downlink scheduling information including IDs of users allowed to communicate using the physical downlink shared channel and transport format information for downlink user data; and an uplink scheduling grant including IDs of users allowed to communicate using the physical uplink shared channel and transport format information for uplink user data. Also, the layer 1 processing unit 2081 performs transmission processing such as channel coding and IFFT processing on the downlink scheduling information including IDs of users allowed to communicate using the physical downlink shared channel and transport format information for downlink user data; and the uplink scheduling grant including IDs of users allowed to communicate using the physical uplink shared channel and transport format information for uplink user data. The downlink scheduling information including IDs of users allowed to communicate using the physical downlink shared channel and transport format information for downlink user data; and the uplink scheduling grant including IDs of users allowed to communicate using the physical uplink shared channel and transport format information for uplink user data are mapped to the physical downlink control channel.

Further, the layer 1 processing unit 2081 demodulates and decodes CQIs and acknowledgement information mapped to the physical uplink control channel transmitted in uplink, and inputs the decoding results to the MAC processing unit 2082.

The MAC processing unit 2082 performs a transmission process in MAC retransmission control (e.g., HARQ), scheduling, selection of transport formats, allocation of frequency resources, and so on for downlink user data. The scheduling is a process of selecting mobile stations allowed to receive user data using a downlink shared channel in a given subframe. The selection of transport formats is a process of determining modulation schemes, coding rates, and data sizes of user data to be received by the mobile stations selected in the scheduling. The modulation schemes, coding rates, and data sizes are determined, for example, based on CQIs reported in uplink by the mobile stations. The allocation of frequency resources is a process of determining resource blocks allocated to user data to be received by the mobile stations selected in the scheduling. The resource blocks are allocated, for example, based on CQIs reported in uplink by the mobile stations. The CQIs reported by the mobile stations are input from the layer 1 processing unit 2081 to the MAC processing unit 2082. Then, the MAC processing unit 2082 determines IDs of users allowed to communicate using the physical downlink shared channel and transport format information for downlink user data through the scheduling, selection of transport formats, and allocation of frequency resources described above, and sends them as the downlink scheduling information to the layer 1 processing unit 2081.

The MAC processing unit 2082 also performs a reception process in MAC retransmission control, scheduling, selection of transport formats, allocation of frequency resources, and so on for uplink user data. The scheduling is a process of selecting mobile stations allowed to transmit user data using an uplink shared channel in a given subframe. The selection of transmission formats is a process of determining modulation schemes, coding rates, and data sizes of user data to be transmitted by the mobile stations selected in the scheduling. The modulation schemes, coding rates, and data sizes are determined, for example, based on SIRs and/or path losses of sounding reference signals (SRS) transmitted from the mobile stations in uplink. The allocation of frequency resources is a process of determining resource blocks allocated to user data to be transmitted by the mobile stations selected in the scheduling. The resource blocks are allocated, for example, based on SIRs of sounding reference signals (SRS) transmitted from the mobile stations in uplink. The MAC processing unit 2082 determines IDs of users allowed to communicate using the physical uplink shared channel and transport format information for uplink user data through the scheduling, selection of transport formats, and allocation of frequency resources described above, and sends them as the uplink scheduling grant to the layer 1 processing unit 2081.

Also, the MAC processing unit 2082 may be configured to stop allocating uplink radio resources to the mobile station 100$_n$ if control information indicating that the amount of user data in the data buffer of the mobile station 100$_n$ is zero is included in the uplink shared channel in a received signal. In other words, the MAC processing unit 2082 may be configured to exclude the mobile station 100$_n$ from the scheduling for the uplink shared channel. More particularly, the MAC processing unit 2082 may be configured to refrain from transmitting the mobile station 100$_n$ the uplink scheduling grant for requesting transmission of an uplink shared channel. In this case, the MAC PDU of the uplink shared channel may be structured as shown in FIG. 4 or 5.

Alternatively, the MAC processing unit 2082 may be configured to stop allocating uplink radio resources to the mobile station 100$_n$ if control information indicating that the amount of user data in the data buffer of the mobile station 100$_n$ is zero is received three times in succession from the mobile station 100$_n$. In other words, the MAC processing unit 2082 may be configured to exclude the mobile station 100$_n$ from the scheduling for the uplink shared channel. More particularly, the MAC processing unit 2082 may be configured to refrain from transmitting the mobile station 100$_n$ the uplink scheduling grant for requesting transmission of an uplink shared channel. In this case, the MAC PDU of the uplink shared channel may be structured as shown in FIG. 4 or 5. The number of times the control information is received is not limited to three (may be two or four or more). "Receiving control information indicating that the amount of user data in the data buffer of the mobile station 100$_n$ is zero three times in succession" indicates that the control information is included in all three latest uplink shared channels received from the mobile station 100$_n$.

Figure 6:
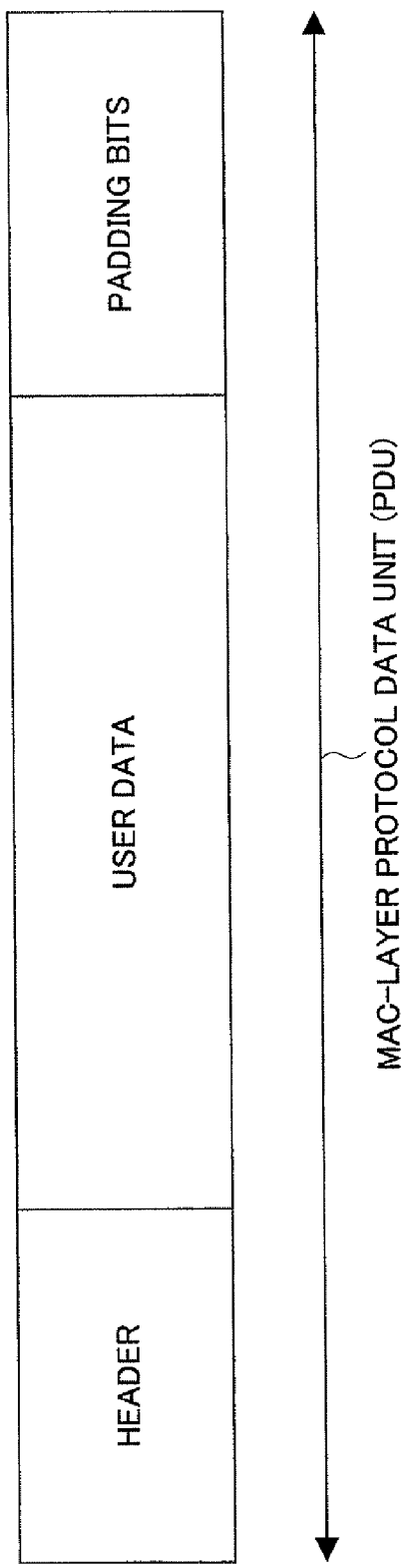
FIG. 6 is a drawing illustrating a structure of a MAC-layer PDU where user data are mapped according to an embodiment of the present invention.

Also, the MAC processing unit 2082 may be configured to stop allocating uplink radio resources to the mobile station 100$_n$ if padding bits are included in the uplink shared channel in a received signal. In other words, the MAC processing unit 2082 may be configured to exclude the mobile station 100$_n$ from the scheduling for the uplink shared channel. More particularly, the MAC processing unit 2082 may be configured to refrain from transmitting the mobile station 100$_n$ the uplink scheduling grant for requesting transmission of an uplink shared channel. In this case, the MAC PDU of the uplink shared channel may be structured as shown in FIG. 6 or 7A.

Further, the MAC processing unit 2082 may be configured to stop allocating uplink radio resources to the mobile station 100$_n$ if a control bit indicating that the amount of user data in the data buffer of the mobile station 100$_n$ is zero is included in the uplink shared channel in a received signal. In other words, the MAC processing unit 2082 may be configured to exclude the mobile station 100$_n$ from the scheduling for the uplink shared channel. More particularly, the MAC processing unit 2082 may be configured to refrain from transmitting the mobile station 100$_n$ the uplink scheduling grant for requesting transmission of an uplink shared channel. In this case, the MAC PDU of the uplink shared channel may be structured as shown in FIG. 7B or 7C.

The RLC processing unit 2083 performs RLC layer transmission processing such as data segmentation/concatenation and a transmission process in RLC retransmission control for downlink packet data, and performs RLC layer reception processing such as data segmentation/concatenation and a reception process in RLC retransmission control for uplink user data. The RLC processing unit 2083 may be configured to perform PDCP layer processing in addition to the RLC layer processing described above.

Figure 10:
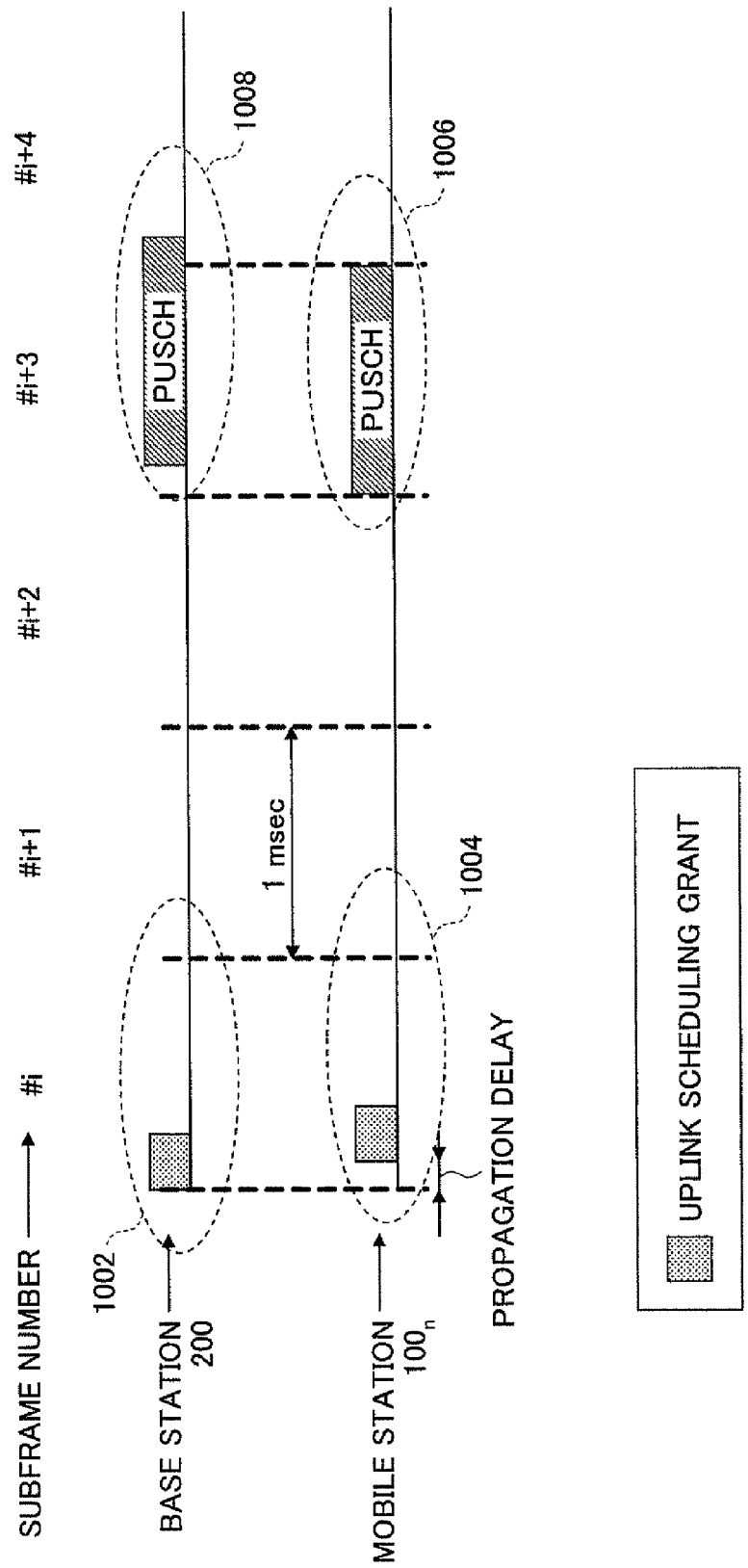
FIG. 10 is a drawing illustrating a temporal relationship between processes preformed by a mobile station and a base station according to an embodiment of the present invention.

FIG. 10 is a drawing illustrating a temporal relationship between processes preformed by the mobile station 100$_n$ and the base station 200. In the example shown in FIG. 10, the base station 200, in subframe #i, transmits an uplink scheduling grant including IDs of users allowed to communicate using a PUSCH (UL-SCH as a transport channel) in subframe #i+3 and transport format information for uplink user data to the mobile stations 100$_n$ via the physical downlink control channel (1002). In subframe #i, the mobile station 100$_n$ (each of the mobile stations 100$_n$) receives the physical downlink control channel (1004). If the IDs of users in the physical downlink control channel allowed to communicate using the PUSCH (UL-SCH as a transport channel) in subframe #i+3 include the corresponding ID of the mobile station $100_n$, the mobile station $100_n$ transmits the PUSCH based on the transport format information in the physical downlink control channel (1006).

If the amount of user data in the data buffer of the RLC processing/buffering unit 1083 is expected to become zero after transmitting the PUSCH, the mobile station $100_n$ attaches control information indicating the status of the data buffer to the UL-SCH to be mapped to the PUSCH and then transmits the PUSCH.

If there is no user data to be transmitted using the PUSCH in subframe #i+3, i.e., if the amount of user data in the data buffer of the RLC processing/buffering unit 1083 is already zero, the mobile station $100_n$ maps control information indicating the status of the data buffer to the PUSCH and then transmits the PUSCH.

The base station 200 receives the PUSCH from the mobile station $100_n$ requested at timing 1002 to transmit the PUSCH in subframe #i+3 (1008).

The base station 200 may be configured to stop allocating uplink radio resources to the mobile station $100_n$ if the control information indicating that the amount of user data in the data buffer of the mobile station $100_n$ is zero is included in the uplink shared channel in the received signal. More specifically, the base station 200 may be configured to exclude the mobile station $100_n$ from the scheduling for the uplink shared channel in the subsequent subframes, for example, subframes #i+4 or #i+5 and later. In other words, the base station 200 may be configured to refrain from transmitting the mobile station $100_n$ the uplink scheduling grant for requesting transmission of an uplink shared channel.

In the example of FIG. 10, the mobile station $100_n$ transmits the uplink shared channel at the third subframe from the subframe where the uplink scheduling grant is received. However, the timing of transmitting the uplink shared channel is not limited to this example.

Figure 11:
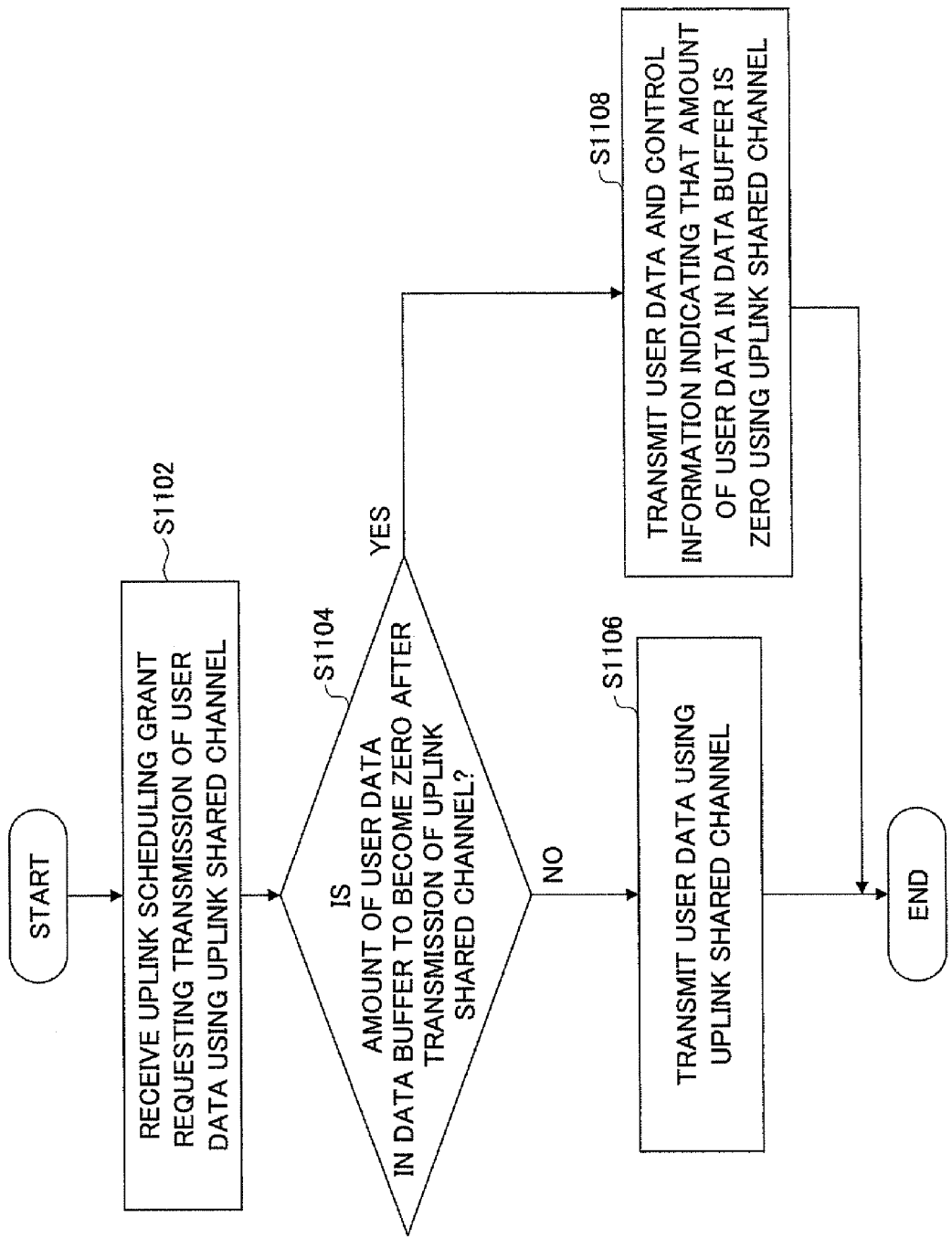
FIG. 11 is a flowchart showing a communication control method performed by a mobile station according to an embodiment of the present invention.

A communication control method performed by the mobile station $100_n$ of this embodiment is described below with reference to FIG. 11.

The mobile station $100_n$ receives the uplink scheduling grant requesting transmission of user data using an uplink shared channel from the base station 200 (step S1102).

Next, the mobile station $100_n$ determines whether the amount of user data in the data buffer is to become zero after the transmission of the uplink shared channel (step S1104).

If the amount of user data in the data buffer is not to become zero after the transmission of the uplink shared channel (NO in step S1104), the mobile station $100_n$ transmits the user data using the uplink shared channel (step S1106).

If the amount of user data in the data buffer is to become zero after the transmission of the uplink shared channel (YES in step S1104), the mobile station $100_n$ transmits the user data and control information indicating that the amount of user data in the data buffer is zero using the uplink shared channel (step S1108). The control information is, for example, MAC-layer control information such as scheduling information indicating a data buffer status.

The MAC processing unit 1082 of the mobile station $100_n$ may be configured to determine whether to transmit the control information at step S1104 based on the type of user data. For example, the MAC processing unit 1082 may be configured to not transmit the control information (NO in step S1104) if the type of user data is gaming user data even if the amount of user data is to become zero, and to transmit the control information (YES in step S1104) if the type of user data is not gaming user data and the amount of user data in the data buffer is to become zero. Also in this case, the MAC processing unit 1082 may be configured not to transmit the control information if the amount of user data in the data buffer is not to become zero.

Figure 12:
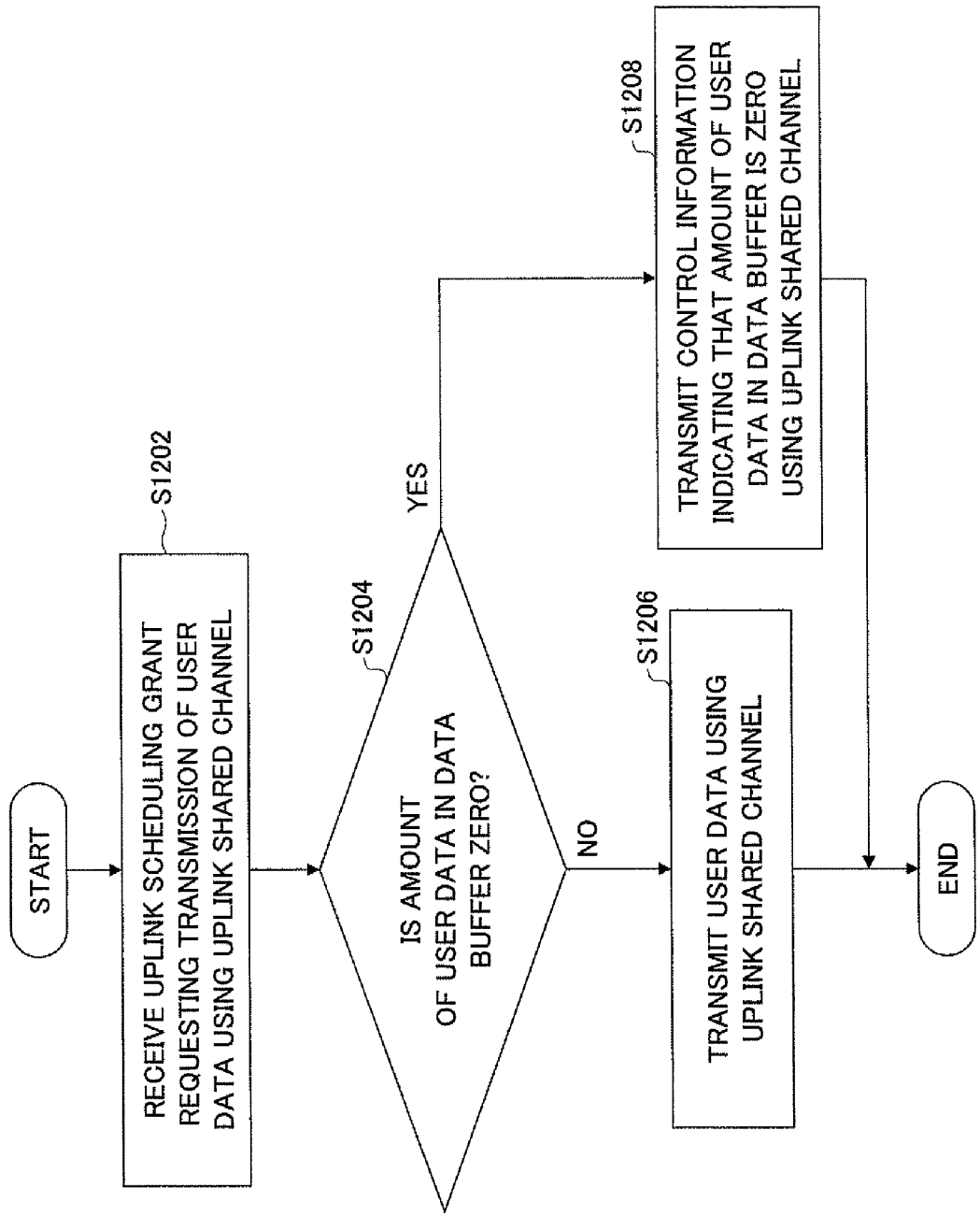
FIG. 12 is a flowchart showing a communication control method performed by a mobile station according to an embodiment of the present invention.

Another communication control method performed by the mobile station $100_n$ of this embodiment is described below with reference to FIG. 12.

The mobile station $100_n$ receives the uplink scheduling grant requesting transmission of user data using an uplink shared channel from the base station 200 (step S1202).

Next, the mobile station $100_n$ determines whether the amount of user data in the data buffer is zero (steps S1204) based on, for example, an instantaneous amount of user data in the corresponding subframe or the amount of user data during a predetermined period of time. Alternatively, the mobile station $100_n$ may be configured to determine whether the amount of user data in the data buffer is zero based on the number of times the uplink scheduling grant is received while the amount of user data is zero.

If the amount of user data in the data buffer is not zero (NO in step S1204), the mobile station $100_n$ transmits the user data using the uplink shared channel (step S1206).

If the amount of user data in the data buffer is zero (YES in step S1204), the mobile station $100_n$ transmits control information indicating that the amount of user data in the data buffer is zero using the uplink shared channel (step S1208). The control information is, for example, MAC-layer control information such as scheduling information indicating a data buffer status.

The MAC processing unit 1082 of the mobile station $100_n$ may be configured to determine whether to transmit the user data or the control information at step S1204 based on the type of user data. For example, the MAC processing unit 1082 may be configured to not transmit the control information (NO in step S1204) if the type of user data is gaming user data even if the amount of user data in the data buffer is zero, and to transmit the control information (YES in step S1204) if the type of user data is not gaming user data and the amount of user data in the data buffer is zero. Also in this case, the MAC processing unit 1082 may be configured not to transmit the control information if the amount of user data in the data buffer is not zero.

Thus, this embodiment makes it possible for the mobile station $100_n$ to explicitly report that the amount of user data in the data buffer is zero to the base station 200. This in turn makes it possible to efficiently allocate radio resources of an uplink shared channel and thereby to increase the uplink capacity.

Another Embodiment

Next, a radio communication system including mobile stations and a base station according to another embodiment of the present invention is described below. Below, transmission of an uplink shared channel, which is particularly relevant to this embodiment of the present invention, is mainly discussed.

In this embodiment, persistent scheduling is employed in the radio communication system. The persistent scheduling is a scheduling scheme where radio resources are allocated at regular intervals and is applicable to transmission of packet data in services such as VoIP and streaming where the transmission rate is comparatively constant (see, for example, R1-060099, Persistent Scheduling for E-UTRA, January, 2006).

The configuration of the radio communication system of this embodiment is substantially the same as that described with reference to FIG. 1.

The configuration of the mobile station $100_n$ of this embodiment is substantially the same as that described with reference to FIGS. 2 and 3 except that the process performed by the MAC processing unit 1082 is connected with the persistent scheduling. Below, differences between the above embodiment and this embodiment are mainly discussed.

In a radio communication system employing persistent scheduling, a period of time where data are transmitted is called a talk spurt. In a talk spurt, radio resources are allocated at regular intervals to the mobile station $100_n$ and data are transmitted using the allocated radio resources.

In each subframe where the radio resources are allocated, the MAC processing unit 1082 of the mobile station $100_n$ attaches control information indicating the status of the data buffer of the RLC processing/buffering unit 1083 to user data if the amount of user data in the data buffer is expected to become zero after transmitting the user data in the subframe, and performs transmission processing for the user data as described above. The control information, for example, indicates the status of a MAC-layer data buffer. More particularly, the control information may indicate that the amount of user data in the data buffer is zero.

In short, scheduling information including control information indicating a UL-SCH buffer status is transmitted when radio resources for uplink transmission are allocated by the persistent scheduling and the UL-SCH buffer status is to become zero after the transmission of the uplink shared channel. In this case, the control information indicates that the UL-SCH buffer status is zero. The scheduling information may include the control information indicating a buffer status and UE power headroom (UPH) indicating transmission power of the mobile station $100_n$.

The UL-SCH buffer status after transmission of an uplink shared channel becomes zero, for example, when the amount of user data in the data buffer is less than a value obtained by subtracting a header size and the size of control information indicating the buffer status from a data size specified by the uplink scheduling grant.

In this case, a MAC-layer protocol data unit (MAC PDU) where user data are mapped includes, for example, a MAC layer header, user data, and the control information indicating a data buffer status as shown in FIG. 4. The MAC PDU is transmitted using the radio resources allocated by the persistent scheduling.

Also, the MAC processing unit 1082 may be configured to perform transmission processing to transmit only the control information indicating a data buffer status if the amount of user data in the data buffer of the RLC processing/buffering unit 1083 is already zero in a subframe where radio resources are allocated by the persistent scheduling. Also in this case, the control information indicates the status of a MAC-layer data buffer, and particularly indicates that the amount of user data in the data buffer is zero.

In short, scheduling information including control information indicating a UL-SCH buffer status is transmitted when radio resources for uplink transmission are allocated by the persistent scheduling and the UL-SCH buffer status is zero. In this case, the control information indicates that the UL-SCH buffer status is zero. The scheduling information may include the control information indicating a buffer status and UE power headroom (UPH) indicating transmission power of the mobile station $100_n$.

In this case, a MAC-layer protocol data unit (MAC PDU) where the control information indicating a data buffer status is mapped includes, for example, a MAC layer header and the control information indicating a data buffer status as shown in FIG. 5. The MAC PDU is transmitted using the radio resources allocated by the persistent scheduling.

Meanwhile, in a service such as VoIP employing persistent scheduling where data with a small size are generated sporadically, it is necessary to monitor generation of data in a comparatively long period of time. For example, the MAC processing unit 1082 may be configured to transmit the control information indicating that the UL-SCH buffer status is zero when conditions as described below are met.

In the above example, the MAC processing unit 1082 transmits the control information indicating that the UL-SCH buffer status is zero as soon as the UL-SCH buffer status becomes zero. Instead, the MAC processing unit 1082 may be configured to transmit the control information indicating that the UL-SCH buffer status is zero if the amount of data in the UL-SCH data buffer remains zero for a predetermined period of time. Specifically, the MAC processing 1082 may be configured to start a timer when the amount of data in the UL-SCH data buffer becomes zero and to transmit the control information indicating that the UL-SCH buffer status is zero if transmission of an uplink shared channel is requested by the uplink scheduling grant after the timer exceeds a predetermined period of time. For example, the MAC processing unit 1082 transmits the control information indicating that the UL-SCH buffer status is zero after 100 ms from when the amount of data in the UL-SCH data buffer becomes zero. Needless to add, the predetermined period of time is not limited to 100 ms.

Alternatively, the MAC processing unit 1082 may be configured to determine whether to transmit the control information indicating that the UL-SCH buffer status is zero based on the number of times radio resources are allocated by the persistent scheduling while the amount of data in the UL-SCH data buffer is zero. For example, if radio resources are allocated three times by the persistent scheduling after the amount of data in the UL-SCH data buffer becomes zero, the MAC processing unit 1082 transmits the control information indicating that the UL-SCH buffer status is zero using the radio resources allocated for the third time. Needless to add, the number of times radio resources are allocated is not limited to three.

Further, the MAC processing unit 1082 may be configured to transmit the control information indicating that the UL-SCH buffer status is zero a predetermined number of times while the amount of data in the UL-SCH data buffer is zero and while radio resources are allocated by the persistent scheduling, and to release the radio resources allocated by the persistent scheduling or determine that the radio resources allocated by the persistent scheduling are released if the UL-SCH buffer status remains zero even after transmitting the control information the predetermined number of times. In other words, in the above occasion, the MAC processing unit 1082 may be configured to stop uplink transmission using the radio resources allocated by the persistent scheduling. When the MAC processing unit 1082 transmits the control information for the first of the predetermined number of times, the amount of data in the UL-SCH data buffer may be not zero but expected to become zero after data transmission in the corresponding subframe.

For example, after the amount of data in the UL-SCH data buffer becomes zero, the MAC processing unit 1082 transmits the control information indicating that the UL-SCH buffer status is zero if the amount of data in the UL-SCH data buffer remains zero in a subsequent subframe where radio resources are allocated by the persistent scheduling. Then, after transmitting the control information indicating that the UL-SCH buffer status is zero three times in succession in subframes where the radio resources are allocated by the persistent scheduling, the MAC processing unit 1082 determines that the radio resources allocated by the persistent scheduling are released. In other words, in the above occasion, the MAC processing unit 1082 stops uplink transmission using the radio resources allocated by the persistent scheduling. Needless to add, the number of times the control information is transmitted in succession is not limited to three.

In the above example, a period where the amount of data in a data buffer is zero corresponds to a silent period in VoIP communication. Therefore, information transmitted during a silent period, e.g., background noise, is preferably not treated as data in the data buffer. Alternatively, the control information indicating that the UL-SCH buffer status is zero may be transmitted when a silent period is detected based on the amount of background noise.

In this case, the MAC processing unit 1082 releases the radio resources allocated to the mobile station $100_n$ by the persistent scheduling after transmitting the control information indicating that the UL-SCH buffer status is zero. In other words, in the above occasion, the MAC processing unit 1082 stops uplink transmission using the radio resources allocated by the persistent scheduling.

In the above examples, the mobile station $100_n$ reports that the UL-SCH buffer status is zero by using control information indicating the UL-SCH buffer status. Alternatively, the mobile station $100_n$ may be configured to report that the UL-SCH buffer status is zero by using padding bits or a control bit. For example, using a control bit represented by one bit to indicate whether the amount of data in the data buffer is zero makes it possible to reduce the overhead and thereby improve the communication efficiency. As the control bit indicating whether the amount of data in the data buffer is zero, a control bit indicating the end of a talk spurt may be used.

When padding bits are used, the MAC PDU may be structured as shown in FIG. 6 or 7A; and when a control bit is used, the MAC PDU may be structured as shown in FIG. 7B or 7C.

The configuration of the base station 200 of this embodiment is substantially the same as that described with reference to FIGS. 8 and 9 except that the process performed by the MAC processing unit 2082 is connected with the persistent scheduling. Below, differences between the above embodiment and this embodiment are mainly discussed.

The MAC processing unit 2082 performs, for uplink and downlink, MAC retransmission control for user data, selection of users (scheduling), selection of transmission formats, allocation of frequency resources, and so on.

Also, if control information indicating that the amount of user data in the data buffer of the mobile station $100_n$ is zero is included in uplink user data transmitted using radio resources allocated by the persistent scheduling, the MAC processing unit 2082 releases the radio resources allocated by the persistent scheduling to the mobile station 100. In other words, the MAC processing unit 2082 stops allocation of radio resources by the persistent scheduling to the mobile station 100. In this case, the MAC PDU where the uplink user data are mapped may be structured as shown in FIG. 4 or 5.

If the mobile station $100_n$ is configured to transmit the control information indicating that the UL-SCH buffer status is zero a predetermined number of times while the amount of data in the UL-SCH data buffer is zero and while radio resources are allocated by the persistent scheduling and to release the radio resources allocated by the persistent scheduling if the UL-SCH buffer status remains zero even after transmitting the control information the predetermined number of times, the MAC processing unit 2082 may be configured to release the radio resources allocated to the mobile station $100_n$ by the persistent scheduling after receiving the control information indicating that the UL-SCH buffer status is zero from the mobile station $100_n$ the predetermined number of times in subframes where the radio resources are allocated. In other words, the MAC processing unit 2082 stops allocation of radio resources by the persistent scheduling to the mobile station $100_n$.

For example, if the mobile station $100_n$ is configured to release radio resources allocated by the persistent scheduling after transmitting the control information indicating that the UL-SCH buffer status is zero three times in succession in subframes where the radio resources are allocated by the persistent scheduling, the MAC processing unit 2082 releases the radio resources allocated by the persistent scheduling to the mobile station $100_n$ after receiving the control information indicating that the UL-SCH buffer status is zero three times in succession in the subframes where the radio resources are allocated to the mobile station $100_n$. In other words, the MAC processing unit 2082 stops allocation of radio resources by the persistent scheduling to the mobile station $100_n$. Needless to add, the number of times the control information is transmitted or received in succession is not limited to three.

This configuration enables the base station 200 to allocate the released radio resources to other mobile stations $100_n$ and thereby makes it possible to efficiently use radio resources.

The MAC processing unit 2082 may be configured to release the radio resources allocated by the persistent scheduling to the mobile station $100_n$ in a similar manner even when the mobile station $100_n$ is configured to report that the UL-SCH buffer status is zero by using padding bits or a control bit instead of the control information indicating the UL-SCH buffer status.

Also, the MAC processing unit 2082 may be configured to transmit or not transmit a control signal explicitly indicating release of radio resources allocated by the persistent scheduling to the mobile station $100_n$ when releasing the radio resources. In other words, the base station 200 may be configured to explicitly release the radio resources by transmitting the control signal or configured to implicitly release the radio resources without transmitting the control signal. From a different point of view, it can be interpreted as that the mobile station $100_n$ is configured to explicitly release the radio resources if the base station 200 is configured to transmit the control signal or to implicitly release the radio resources if the base station 200 is configured not to transmit the control signal.

Figure 13:
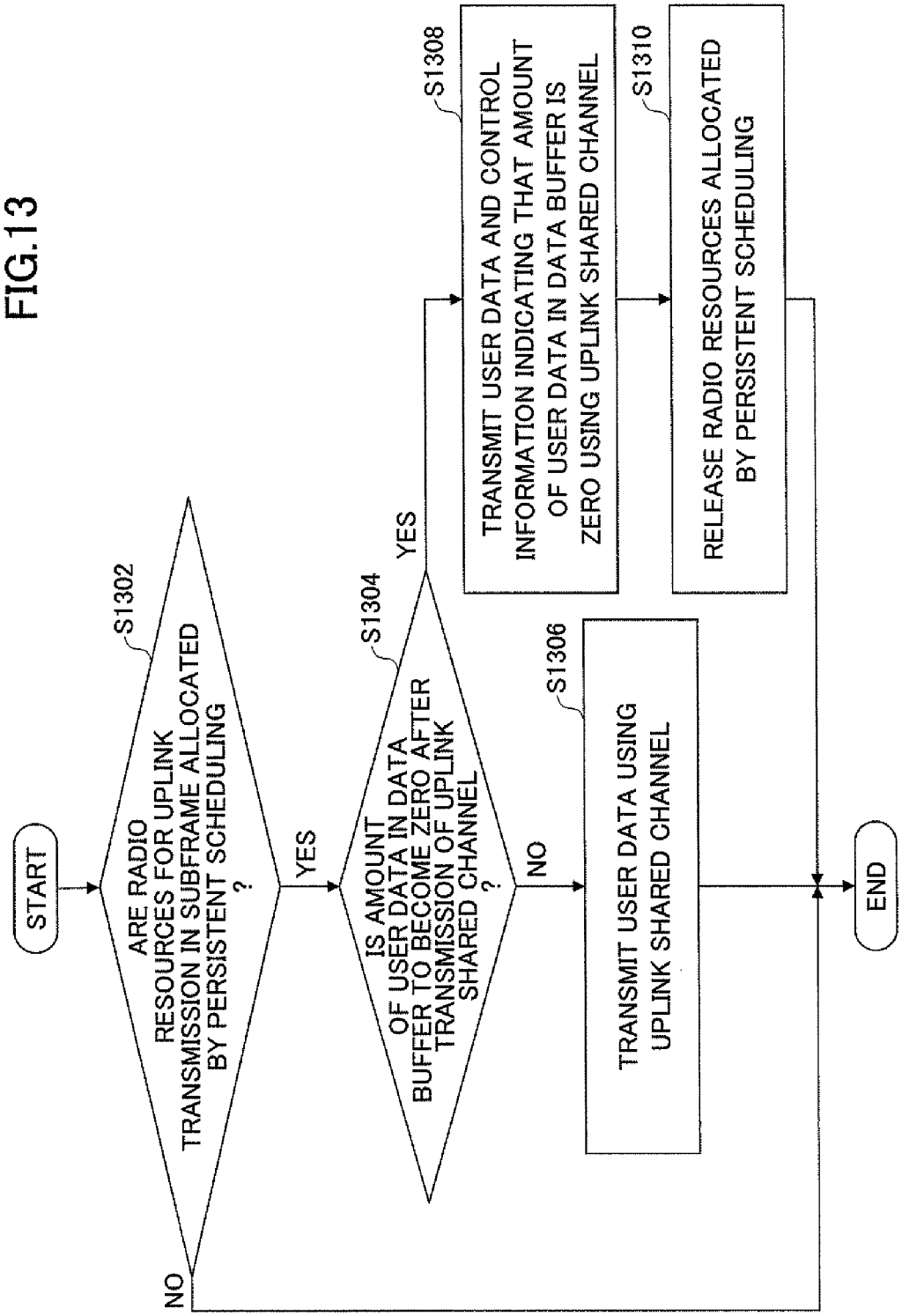
FIG. 13 is a flowchart showing a communication control method according to an embodiment of the present invention.

A communication control method performed by the mobile station $100_n$ of this embodiment is described below with reference to FIG. 13. In this embodiment, the base station 200 performs persistent scheduling to allocate radio resources for uplink transmission at intervals to the mobile station $100_n$.

In each subframe, the mobile station $100_n$ determines whether radio resources for uplink transmission are allocated to itself by the persistent scheduling (step S1302).

If radio resources for uplink transmission are allocated (YES in step S1302), the mobile station $100_n$ determines whether the amount of user data in the data buffer is to become zero after transmission of an uplink shared channel (step S1304).

If no radio resource is allocated for uplink transmission (NO in step S1302), the mobile station $100_n$ terminates the process.

If the amount of user data in the data buffer is not to become zero after the transmission of the uplink shared channel (NO in step S1304), the mobile station $100_n$ transmits the user data using the uplink shared channel (step S1306).

If the amount of user data in the data buffer is to become zero after the transmission of the uplink shared channel (YES in step S1304), the mobile station $100_n$ transmits the user data and control information indicating that the amount of user data in the data buffer is zero using the uplink shared channel (step S1308). The control information is, for example, MAC-layer control information such as scheduling information indicating a data buffer status.

In step S1310, the mobile station $100_n$ releases the radio resources allocated by the persistent scheduling.

Another communication control method performed by the mobile station $100_n$ of this embodiment is described below with reference to FIG. 14. In this embodiment, the base station 200 performs persistent scheduling to allocate radio resources for uplink transmission at intervals to the mobile station $100_n$.

In each subframe, the mobile station $100_n$ determines whether radio resources for uplink transmission are allocated to itself by the persistent scheduling (step S1402).

If radio resources for uplink transmission are allocated (YES in step S1402), the mobile station $100_n$ determines whether the amount of user data in the data buffer is zero (step S1404). Here, the mobile station $100_n$ may be configured to determine whether the amount of user data in the data buffer is zero based on an instantaneous amount of user data in the corresponding subframe or the amount of user data during a predetermined period of time. Alternatively, the mobile station $100_n$ may be configured to determine whether the amount of user data is zero based on the number of times the uplink scheduling grant is received while the amount of user data is zero.

If no radio resource is allocated for uplink transmission (NO in step S1402), the mobile station $100_n$ terminates the process.

If the amount of user data in the data buffer is not zero (NO in step S1404), the mobile station $100_n$ transmits the user data using the uplink shared channel (step S1406).

If the amount of user data in the data buffer is zero (YES in step S1404), the mobile station $100_n$ transmits control information indicating that the amount of user data in the data buffer is zero using the uplink shared channel (step S1408). The control information is, for example, MAC-layer control information such as scheduling information indicating a data buffer status.

In step S1410, the mobile station $100_n$ releases the radio resources allocated by the persistent scheduling.

A communication control method performed by the base station 200 of this embodiment is described below with reference to FIG. 15. In this embodiment, the base station 200 performs persistent scheduling to allocate radio resources for uplink transmission at intervals to the mobile station $100_n$.

In each subframe, the base station 200 determines whether radio resources for uplink transmission are allocated to the mobile station $100_n$ by the persistent scheduling (step S1502).

If radio resources for uplink transmission are allocated to the mobile station $100_n$ (YES in step S1502), the base station 200 receives an uplink shared channel transmitted using the radio resources allocated by the persistent scheduling (step S1504).

If no radio resource is allocated for uplink transmission (NO in step S1502), the base station 200 terminates the process.

In step S1506, the base station 200 determines whether control information indicating that the amount of user data in the data buffer is zero is included in the uplink shared channel.

If the control information indicating that the amount of user data in the data buffer is zero is included in the uplink shared channel (YES in step S1506), the base station 200 releases the radio resources allocated by the persistent scheduling (step S1508).

If the control information indicating that the amount of user data in the data buffer is zero is not included in the uplink shared channel (NO in step S1506), the base station 200 terminates the process.

In step S1506 described above, the base station 200 determines whether the control information indicating that the amount of user data in the data buffer is zero is included in the uplink shared channel. Alternatively, the base station 200 may be configured to determine whether the uplink shared channel includes only the control information indicating that the amount of user data in the data buffer is zero. In this case, the base station 200 does not release the radio resources if the uplink shared channel includes user data (NO in steps S1506).

Next, another communication control method performed by the mobile station $100_n$ of this embodiment is described below with reference to FIG. 16. In the communication control method of FIG. 16, it is assumed that the mobile station $100_n$ is configured to release radio resources allocated by the persistent scheduling after transmitting the control information indicating that the UL-SCH buffer status is zero three times in succession in subframes where the radio resources are allocated by the persistent scheduling. In this embodiment, the base station 200 performs persistent scheduling to allocate radio resources for uplink transmission at intervals to the mobile station $100_n$.

In each subframe, the mobile station $100_n$ determines whether radio resources for uplink transmission are allocated to itself by the persistent scheduling (step S1602).

If radio resources for uplink transmission are allocated (YES in step S1602), the mobile station $100_n$ determines whether control information indicating that the UL-SCH buffer status is zero has been transmitted three times in succession in subframes where the radio resources are allocated by the persistent scheduling (step S1604).

If no radio resource is allocated for uplink transmission (NO in step S1602), the mobile station $100_n$ terminates the process.

If the control information indicating that the UL-SCH buffer status is zero has been transmitted three times in succession in subframes where the radio resources are allocated by the persistent scheduling (YES in step S1604), the mobile station $100_n$ releases the radio resources allocated by the persistent scheduling (step S1606).

If the control information indicating that the UL-SCH buffer status is zero has not been transmitted three times in succession in subframes where the radio resources are allocated by the persistent scheduling (NO in step S1604), the mobile station $100_n$ terminates the process.

Next, another communication control method performed by the base station 200 of this embodiment is described below with reference to FIG. 17. In the communication control method of FIG. 17, it is assumed that the mobile station $100_n$ is configured to release radio resources allocated by the persistent scheduling after transmitting the control information indicating that the UL-SCH buffer status is zero three times in succession in subframes where the radio resources are allocated by the persistent scheduling. In this embodiment, the base station 200 performs persistent scheduling to allocate radio resources for uplink transmission at intervals to the mobile station 100$_n$.

In each subframe, the base station 200 determines whether radio resources for uplink transmission are allocated to the mobile station 100$_n$ by the persistent scheduling (step S1702).

If radio resources for uplink transmission are allocated to the mobile station 100$_n$ (YES in step S1702), the base station 200 receives an uplink shared channel transmitted using the radio resources allocated by the persistent scheduling (step S1704).

If no radio resource is allocated for uplink transmission (NO in step S1702), the base station 200 terminates the process.

After step S1704, the base station 200 determines whether control information indicating that the UL-SCH buffer status is zero has been received three times in succession in subframes where the radio resources are allocated by the persistent scheduling (step S1706).

If the control information indicating that the UL-SCH buffer status is zero has been received three times in succession in subframes where the radio resources are allocated by the persistent scheduling (YES in step S1706), the base station 200 releases the radio resources allocated by the persistent scheduling (step S1708).

If the control information indicating that the UL-SCH buffer status is zero has not been received three times in succession in subframes where the radio resources are allocated by the persistent scheduling (NO in step S1706), the base station 200 terminates the process.

If the above exemplary processes, whether the control information indicating that the UL-SCH buffer status is zero has been transmitted or received three times in succession in subframes where the radio resources are allocated by the persistent scheduling is determined. However, the number of times the control information has been transmitted or received is not limited to three (may be two or four or more).

Thus, the above embodiments make it possible for the mobile station 100$_n$ to explicitly report that the amount of user data in the data buffer is zero to the base station 200. This in turn makes it possible to efficiently allocate radio resources of an uplink shared channel and thereby to increase the uplink capacity.

In the above embodiment, it is assumed that the data buffer is an RLC layer buffer. Alternatively, the data buffer may be a MAC layer buffer or a PDCP layer buffer.

In the above embodiments, it is assumed that the radio communication system 1000 is based on Evolved UTRA and UTRAN (also called Long Term Evolution or Super 3G). However, the present invention may also be applied to a mobile station, a base station, a communication control method, and a radio communication system based on any other communication technology using shared channels.

The descriptions and drawings in the above embodiments should not be construed to be limiting the present invention. A person skilled in the art may think of variations of the above embodiments from the descriptions.

In other words, the present invention may also include various embodiments not disclosed above. Therefore, the technical scope of the present invention should be determined based on proper understanding of the claims with reference to the above descriptions.

Although the present invention is described above in different embodiments, the distinctions between the embodiments are not essential for the present invention, and the embodiments may be used individually or in combination. Although specific values are used in the above descriptions to facilitate the understanding of the present invention, the values are just examples and different values may also be used unless otherwise mentioned.

The present invention is not limited to the specifically disclosed embodiments, and variations and modifications may be made without departing from the scope of the present invention. Although functional block diagrams are used to describe apparatuses in the above embodiments, the apparatuses may be implemented by hardware, software, or a combination of them.

The present international application claims priority from Japanese Patent Application No. 2007-056441 filed on Mar. 6, 2007, Japanese Patent Application No. 2007-211591 filed on Aug. 14, 2007, Japanese Patent Application No. 2007-211982 filed on Aug. 15, 2007, and Japanese Patent Application No. 2007-329025 filed on Dec. 20, 2007, the entire contents of which are hereby incorporated herein by reference.

The invention claimed is:

1. A mobile station communicating with a base station in a radio communication system, the mobile station comprising:
a transmitting unit configured to transmit user data to the base station,
wherein when an amount of the user data in a buffer of the mobile station is to become zero after the transmission of the user data, the transmitting unit is configured to transmit control information together with the user data to the base station, the control information indicating that the amount of user data in the buffer of the mobile station is to become zero after the transmission of the user data.

2. The mobile station as claimed in claim 1, wherein the transmission of user data is requested by the base station.

3. The mobile station as claimed in claim 2, wherein the transmission of user data is requested by an uplink scheduling grant transmitted from the base station.

4. A mobile station communicating with a base station in a radio communication system, the mobile station comprising:
a transmitting unit configured, if an amount of a first signal in a buffer of the mobile station is zero, to transmit a second signal including padding bits to the base station.

5. The mobile station as claimed in claim 4, wherein the second signal is a control signal for reporting the amount of the first signal in the buffer of the mobile station.

6. The mobile station as claimed in claim 4, wherein the transmission of the first signal is requested by the base station.

7. A base station communicating with a mobile station in a radio communication system, the base station comprising:
a requesting unit configured to request the mobile station to transmit user data,
wherein if control information reporting that an amount of the user data in a buffer of the mobile station has become zero after the transmission of the user data is received from the mobile station together with the user data, the requesting unit is configured not to request the mobile station to transmit the user data.

8. A base station communicating with a mobile station in a radio communication system, the base station comprising:
a requesting unit configured to request the mobile station to transmit a first signal,
wherein if padding bits are included in the first signal transmitted from the mobile station, the requesting unit is configured not to request the mobile station to transmit the first signal.

9. A base station communicating with a mobile station in a radio communication system and employing a scheduling scheme for allocating radio resources to the mobile station at intervals, the base station comprising:
- a receiving unit configured to receive user data from the mobile station according to the scheduling scheme; and
- a releasing unit configured to release the radio resources allocated for the user data if control information reporting that an amount of the user data in a buffer of the mobile station has become zero after the transmission of the user data is received from the mobile station together with the user data.

10. The base station as claimed in claim 9, wherein the releasing unit is configured to release the radio resources allocated for the user data first-signal after the mobile station reports that the amount of the user data in the buffer is zero a predetermined number of times in succession.

11. A communication control method in a radio communication system including a mobile station and a base station communicating with the mobile station, the method comprising:
- a first step, performed by the base station, of requesting the mobile station to transmit user data to the base station; and
- a second step, performed by the mobile station, of transmitting control information together with the user data to the base station if an amount of the user data in a buffer of the mobile station is to become zero after the transmission of the user data, the control information indicating that the amount of the user data in the buffer of the mobile station is to become zero after the transmission of the user data.

* * * * *